US009807725B1

(12) United States Patent
Vitus et al.

(10) Patent No.: US 9,807,725 B1
(45) Date of Patent: Oct. 31, 2017

(54) DETERMINING A SPATIAL RELATIONSHIP BETWEEN DIFFERENT USER CONTEXTS

(71) Applicants: Sensor Platforms, Inc., Mountain View, CA (US); Knowles Electronics, LLC, Itasca, IL (US)

(72) Inventors: Deborah Kathleen Vitus, Mountain View, CA (US); Benjamin E. Joseph, Mountain View, CA (US); Kevin A. Shaw, Millbrae, CA (US); James V. Steele, Los Gatos, CA (US); Carlo Murgia, Sunnyvale, CA (US)

(73) Assignees: Knowles Electronics, LLC, Itasca, IL (US); Sensor Platforms, Inc., Mountain View, CA (US)

( * ) Notice: Subject to any disclaimer, the term of this patent is extended or adjusted under 35 U.S.C. 154(b) by 0 days.

(21) Appl. No.: 14/683,057

(22) Filed: Apr. 9, 2015

Related U.S. Application Data

(60) Provisional application No. 61/979,438, filed on Apr. 14, 2014, provisional application No. 61/977,986, filed on Apr. 10, 2014.

(51) Int. Cl.
*H04W 64/00* (2009.01)
*H04W 8/22* (2009.01)
(Continued)

(52) U.S. Cl.
CPC ............. *H04W 64/00* (2013.01); *H04W 4/02* (2013.01); *H04W 8/22* (2013.01)

(58) Field of Classification Search
CPC ....... H04W 4/02; H04W 4/023; H04W 4/008; H04W 4/028; H04W 4/043; H04W 4/12;
(Continued)

(56) References Cited

U.S. PATENT DOCUMENTS

| 5,625,697 A | 4/1997 | Bowen et al. |
| 7,028,547 B2 | 4/2006 | Shiratori et al. |

(Continued)

FOREIGN PATENT DOCUMENTS

| WO | WO2004047011 A2 | 6/2004 |
| WO | WO2009093161 A1 | 7/2009 |

(Continued)

OTHER PUBLICATIONS

International Search Report and Written Opinion for International Application No. PCT/US2013/058055 mailed Dec. 2, 2013.
Vinande et al., "Mounting-Angle Estimation for Personal Navigation Devices," IEEE Transactions on Vehicular Technology, vol. 59, No. 3, Mar. 2010, pp. 1129-1138.
Zhao et al. "Towards Arbitrary Placement of Multi-Sensors Assisted Mobile Navigation System," In Proceedings of the 23rd International Technical Meeting of the Satellite Division of The Institute of Navigation, Portland, OR, Sep. 21-24, 2010, pp. 556-564.
(Continued)

Primary Examiner — Inder Mehra
(74) Attorney, Agent, or Firm — Foley & Larner LLP

(57) ABSTRACT

A processing apparatus including one or more processors and memory determines a first context of a first user at a first location in a physical space based on sensor measurements from one or more sensors of a set of one or more devices coupled to the first user and detects movement of the first user to a second location in the physical space based on sensor measurements from one or more sensors of the devices. The processing apparatus determines a second context of the first user at the second location based on sensor measurements from one or more sensors of the devices and generates, based on the first context, the second context, and the movement of the user from the first location to the second location, a first mapping of the physical space that includes information corresponding to a spatial relationship between the first context and the second context.

19 Claims, 21 Drawing Sheets

(51) Int. Cl.
*H04W 4/02* (2009.01)
*H04W 4/00* (2009.01)

(58) Field of Classification Search
CPC ....... H04W 4/20; H04W 4/206; H04W 64/00; H04W 8/18; H04W 4/025; H04W 4/027; H04W 4/04
USPC .... 455/456.1, 456.3, 414.1, 418, 411, 414.3, 455/41.2, 457, 466, 550.1, 26.1, 410, 415, 455/416, 421, 423, 444, 456.5, 556.1, 455/67.11; 370/254, 329; 707/798, 716; 705/14.58

See application file for complete search history.

(56) References Cited

U.S. PATENT DOCUMENTS

| | | | |
|---|---|---|---|
| 7,171,008 | B2 | 1/2007 | Elko |
| 7,940,986 | B2 | 5/2011 | Mekenkamp et al. |
| 7,978,178 | B2 | 7/2011 | Pehlivan et al. |
| 8,194,880 | B2 | 6/2012 | Avendano |
| 8,223,121 | B2 | 7/2012 | Shaw et al. |
| 8,473,287 | B2 | 6/2013 | Every et al. |
| 8,515,707 | B2 | 8/2013 | Joseph et al. |
| 8,712,069 | B1 | 4/2014 | Murgia et al. |
| 8,750,526 | B1 | 6/2014 | Santos et al. |
| 8,775,128 | B2 | 7/2014 | Meduna et al. |
| 9,185,487 | B2 | 11/2015 | Solbach et al. |
| 2003/0107888 | A1 | 6/2003 | Devlin et al. |
| 2003/0236604 | A1 | 12/2003 | Lu et al. |
| 2005/0033200 | A1 | 2/2005 | Soehren et al. |
| 2005/0094610 | A1 | 5/2005 | de Clerq et al. |
| 2005/0172311 | A1 | 8/2005 | Hjelt et al. |
| 2007/0273583 | A1 | 11/2007 | Rosenberg |
| 2008/0019548 | A1 | 1/2008 | Avendano |
| 2008/0140338 | A1 | 6/2008 | No et al. |
| 2009/0143972 | A1 | 6/2009 | Kitamura et al. |
| 2009/0167862 | A1* | 7/2009 | Jentoft ............. G08B 13/19641 348/143 |
| 2009/0323982 | A1 | 12/2009 | Solbach et al. |
| 2010/0081487 | A1 | 4/2010 | Chen et al. |
| 2010/0095773 | A1 | 4/2010 | Shaw et al. |
| 2010/0134241 | A1 | 6/2010 | Gips et al. |
| 2010/0157168 | A1 | 6/2010 | Dunton et al. |
| 2010/0174506 | A1 | 7/2010 | Joseph et al. |
| 2010/0210975 | A1 | 8/2010 | Anthony et al. |
| 2010/0318257 | A1 | 12/2010 | Kalinadhabhotla |
| 2011/0125063 | A1 | 5/2011 | Shalon et al. |
| 2011/0257967 | A1 | 10/2011 | Every et al. |
| 2012/0169482 | A1 | 7/2012 | Chen et al. |
| 2012/0265716 | A1 | 10/2012 | Hunzinger et al. |
| 2012/0268249 | A1 | 10/2012 | Kansal et al. |
| 2012/0316784 | A1* | 12/2012 | Chrysanthakopoulos G01C 21/206 701/519 |
| 2012/0317149 | A1* | 12/2012 | Jagota ............... G06F 17/30958 707/798 |
| 2013/0080843 | A1* | 3/2013 | Stergiou .................. G06F 11/14 714/49 |
| 2013/0127738 | A1* | 5/2013 | Miller ................... G06F 3/0488 345/173 |
| 2013/0282372 | A1 | 10/2013 | Visser et al. |
| 2013/0325616 | A1* | 12/2013 | Ramde ............... G06Q 30/0261 705/14.58 |
| 2014/0129178 | A1 | 5/2014 | Meduna et al. |
| 2014/0149060 | A1 | 5/2014 | Meduna et al. |
| 2014/0181715 | A1* | 6/2014 | Axelrod ................ G06F 3/0487 715/771 |
| 2014/0187258 | A1* | 7/2014 | Khorashadi .......... G01C 21/206 455/456.1 |
| 2015/0012248 | A1 | 1/2015 | Meduna et al. |
| 2015/0247729 | A1 | 9/2015 | Meduna et al. |

FOREIGN PATENT DOCUMENTS

| | | |
|---|---|---|
| WO | WO2009132920 A1 | 11/2009 |
| WO | WO2011092549 A1 | 8/2011 |
| WO | WO2012094522 A1 | 7/2012 |
| WO | WO2014039552 A1 | 3/2014 |
| WO | WO2014074268 A1 | 5/2014 |
| WO | WO2014085615 A2 | 6/2014 |
| WO | WO2014127543 A1 | 8/2014 |

OTHER PUBLICATIONS

International Search Report and Written Opinion in Patent Cooperation Treaty Application No. PCT/US2013/072278 mailed Dec. 19, 2014.
Wang et al., "A Framework of Energy Efficient Mobile Sensing for Automatic User State Recognition," Proceedings of the 7th International Conference on Mobile Systems, Applications, and Services, MOBISYS '09, Jun. 2009, pp. 179-192.
Specification, U.S. Appl. No. 61/615,327, filed Mar. 25, 2012.
Non-Final Office Action, May 9, 2014, U.S. Appl. No. 13/343,654, filed Jan. 4, 2012.
Final Office Action, Aug. 4, 2014, U.S. Appl. No. 13/343,654, filed Jan. 4, 2012.
Non-Final Office Action, Feb. 26, 2015, U.S. Appl. No. 13/343,654, filed Jan. 4, 2012.
Final Office Action, Sep. 8, 2015, U.S. Appl. No. 13/343,654, filed Jan. 4, 2012.
Non-Final Office Action, Dec. 17, 2014, U.S. Appl. No. 14/321,707, filed Jul. 1, 2014.
Final Office Action, Aug. 7, 2015, U.S. Appl. No. 14/321,707, filed Jul. 1, 2014.
Non-Final Office Action, Mar. 18, 2016, U.S. Appl. No. 14/321,707, filed Jul. 1, 2014.
International Search Report and Written Opinion mailed May 23, 2012 in Patent Cooperation Treaty Application No. PCT/US2012/020365, filed May 1, 2012.
Hjorth, Bo. "EEG Analysis Based on Time Domain Properties." Electroencephalography and Clinical Neurophysiology, vol. 29, No. 3 (1970). pp. 306-310.
Hjorth, Bo. "The Physical Significance of Time Domain Descriptions in EEG Analysis," Electroencephalography and Clinical Neurophysiology, vol. 34, No. 3, (1973). pp. 321-325.
Hjorth, Bo. "An On-line Transformation of EEG Scalp Potentials into Orthogonal Source Derivations," Electroencephalography and Clinical Neurophysiology, vol. 39, No. 5 (1975). pp. 526-530.
Jimenez et al., "A Comparison of Pedestrian Dead-Reckoning Algorithms Using a Low-Cost MEMS IMU," WISP 2009. 6th IEEE International Symposium on Intelligent Signal Processing, Aug. 26-28, 2009. pp. 37-42.
International Search Report and Written Opinion mailed May 7, 2014 in Patent Cooperation Treaty Application No. PCT/US2013/064645 filed Oct. 11, 2013.
Sedlak, J. "Spinning Spacecraft Attitude Estimation Using Markley Variables: Filter Implementation and Results," NASA Goddard Space Flight Center CP-2005-212789, Greenbelt, MD (2005), 15 pages.
Luong-Van et al. "Covariance Profiling for an Adaptive Kalman Filter to Suppress Sensor Quantization Effects," 43rd IEEE Conference on Decision and Control, vol. 3, Dec. 14-17, 2004, pp. 2680-2685.
International Search Report and Written Opinion mailed Apr. 8, 2016 in Patent Cooperation Treaty Application No. PCT/US2016/015801.

* cited by examiner

DETERMINING A SPATIAL RELATIONSHIP BETWEEN DIFFERENT USER CONTEXTS

CROSS-REFERENCE TO RELATED APPLICATIONS

The present application claims the benefit of U.S. Provisional Application No. 61/979,438, filed on Apr. 14, 2014, and U.S. Provisional Application 61/977,986, filed on Apr. 10, 2014. The subject matter of the aforementioned applications is incorporated herein by reference for all purposes.

FIELD

The disclosed embodiments relate generally to determining and using context information to improve device performance.

BACKGROUND

Some devices have access to sensor measurements from one or more sensors. These sensor measurements can be used to determine information about states associated with the device such as a location of the device, a coupling state of the device to one or more entities, a state of one or more entities physically associated with the device and/or a state of an environment in which the device is located.

SUMMARY

The location and/or context of a device, as determined by sensors of the device can be used to adjust operation of the device and/or provide information to the user that enables the user to operate the device more efficiently. For example, a smartphone can be silenced when a user is in a movie theater or other common space and enabled to provide audible alerts such as ringtones when the user is in a private space such as an office or car. Additionally, information about a location of a device can be used to provide the user with directions. However, some solutions for determining a location of a device, such as the Global Positioning System (GPS), have reduced accuracy indoors. Alternative solutions such as beacon-based navigation require special equipment, such as radio frequency (RF) beacons at predefined locations in the indoor space. It would be advantageous to improve the accuracy of indoor navigation and navigation in other spaces with constrained layouts. Additionally, some solutions for determining a context of a device rely solely on recent sensor measurements of the device. However, the accuracy of this context information is often degraded or invalidated by a few inaccurate sensor measurements or a sudden change in context. These and other deficiencies of methods of location and context determination and device tracking can be reduced or eliminated by tracking movement of one or more users between different contexts over time. For example, information about movement of users between different contexts over time can be used to generate a mapping of a physical space that indicates differences between the different contexts and the possible transitions between different contexts. This mapping can be used to more accurately determine a location and context of a user. Increased accuracy in the location and context of a user can be used by a device to provide localized information (e.g., information about a location of a user in a building or a location of a user on a map) or adjust operation of the device to a current context (e.g., calibrating a sensor of the device based on a known change in temperature or altitude or initiating a "silent mode" for a smartphone when a user is in a meeting), thereby improving the efficiency and ease of use of the device.

Some embodiments provide a method for determining, at a processing apparatus having one or more processors and memory storing one or more programs, a first context of a first user at a first location in a physical space based on sensor measurements from one or more sensors of a set of one or more devices coupled to the first user and detecting movement of the first user to a second location in the physical space based on sensor measurements from one or more sensors of the set of one or more devices coupled to the first user. The method further includes determining a second context of the first user at the second location based on sensor measurements from one or more sensors of the set of one or more devices coupled to the first user and generating, based on the first context, the second context, and the movement of the user from the first location to the second location, a first mapping of the physical space that includes information corresponding to a spatial relationship between the first context and the second context.

Some embodiments provide a method for obtaining, at a processing apparatus having one or more processors and memory storing one or more programs, a mapping of a physical space that includes information corresponding to one or more differences between a first context and a second context and detecting movement of a user from the first context to the second context based on first sensor measurements from one or more sensors of a set of one or more devices coupled to the user. The method further includes, while the user is moving from the first context to the second context, collecting second sensor measurements from one or more sensors of the set of one or more devices, where the second sensor measurements correspond to changes in the values of one or more context parameters detected while moving between the first context and the second context. The method also includes comparing the second sensor measurements collected from the one or more sensors to the one or more differences between the first context and the second context and calibrating the one or more sensors based at least in part on the comparison between the measurements collected from the one or more sensors and the one or more differences between the first context and the second context.

Some embodiments provide a method for obtaining, at a processing apparatus having one or more processors and memory storing one or more programs, acoustic information based on acoustic measurements of ambient sounds recorded by one or more sensors of a set of one or more devices coupled to a user and obtaining inertial information based on inertial measurements recorded by one or more sensors of the set of one or more devices coupled to the user. The method further includes correlating the acoustic information with the inertial information, based on a time that corresponds to the acoustic information and a time that corresponds to the inertial information, to produce correlation information, determining a context of a user based on the acoustic information, the inertial information and the correlation information, and performing an operation based at least in part on the context of the user.

In accordance with some embodiments, a computer system (e.g., a navigation sensing device or a host computer system) includes one or more processors, memory, and one or more programs; the one or more programs are stored in the memory and configured to be executed by the one or more processors and the one or more programs include instructions for performing the operations of any of the methods described above. In accordance with some embodiments, a non-transitory computer readable storage medium (e.g., for use by a navigation sensing device or a host computer system) has stored therein instructions which when executed by one or more processors, cause a computer system (e.g., a navigation sensing device or a host computer system) to perform the operations of any of the methods described above.

BRIEF DESCRIPTION OF THE DRAWINGS

Like reference numerals refer to corresponding parts throughout the drawings.

DETAILED DESCRIPTION

Context Awareness

Figure 1:
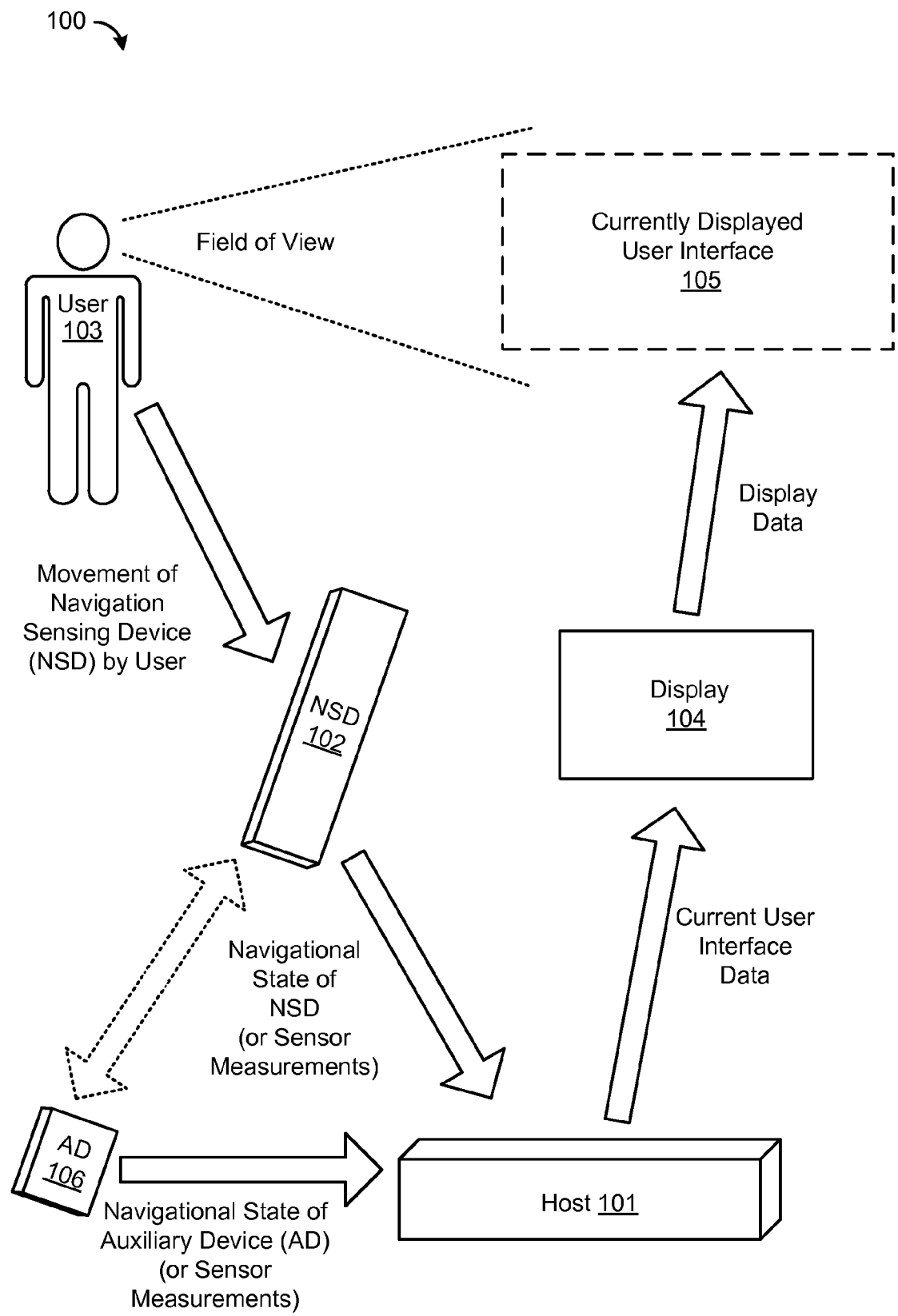
FIG. 1 illustrates a system for using a navigation sensing device, according to some embodiments.

Different navigation sensing devices use different sensors to detect different system statuses: inertial sensors for device motion, proximity sensor for user position relative to the device, global positioning system (GPS) sensors for position relative to a predefined navigational coordinate system. However, some applications that use more than one set of sensor results do not combine inputs from multiple sensor subsystems to implement new functions. For example, navigation sensing devices use application data, usage history, GPS or other beacons, and some even use system-level information such as Bluetooth connections and wireless networking (Wi-Fi) networks separately. Substantial advantages can be realized by combining sensor measurements from monitoring sensors (e.g., inertial sensors and other low power "always on" sensors) can be combined with other sensors in a mobile device, along with other operating system services and functions to improve the context detection performance, reduce power consumption, or expand utility of the navigation sensing device.

For example, a device (e.g., a navigation sensing device) can use sensors to evaluate the natural motions of a user and analyze the data pattern intelligently to deduce what the user is doing. Similarly, sensors can also record changes in their users' environments, such as magnetic field characteristics and ambient pressure to help applications infer their surroundings. What the user is doing (e.g., a current usage pattern of the device) and an environment surrounding a device are sometimes referred to as a device context or device context information for a device that is physically associated with a user (e.g., being held by the user, in a pocket of clothes worn by the user in a bag held by the user, or otherwise physically attached to the user) can be used to determine a user context for the user. In some embodiments, device context information from multiple devices that are physically associated with a user is combined to determine a user context for the user. Context aware applications can modify their interaction with their users depending on contexts (e.g., device context or user context). Device context of a respective device, as used herein, refers to one or more contexts associated with the respective device. Examples of contexts associated with the respective device (i.e., device context) include, without limitation, a usage pattern of the respective device, a navigational state (e.g., position or orientation) of the respective device, a change in navigational state (e.g., translation or rotation) of the respective device, an environment of the respective device, and activities of a user of the respective device (e.g., a posture of the user, a physical activity of the user, a current task of the user, or other information about what the user is doing or how the user is behaving), where these contexts are determined using information obtained from or by the device. Measurements from these sensors (or corresponding context information) collected over time can also be used to generate mappings of physical spaces through which the device moves, and the mappings can be used to further increase the accuracy of context and location determination.

As one example of a context aware application, a car locater application can annotate the location using location information from GPS or Wi-Fi, allow users to append a photo, video or notes about the surrounding. A context aware car locator application can rely on context interpretation procedures, monitor sensor data and note the moment the user has just left his car. That way, in situations when the user is absent minded or in a hurry, the application acts autonomously and records the parking location. Then hours later when the user realizes he does not remember where he left his car, he can consult the application and get the automatically recorded location.

As another example, a context aware mapping application can, by default, provide a pedestrian with walking directions instead of driving directions when the device detects movements that correspond to the user walking. For the context aware mapping application, a user would not need to actively inform his telephone that he is currently walking but can, instead, rely on a determination made by the device that the device has a "user is walking" context.

Another example is a context aware device finder application that operates by keeping track of a history of contexts of the device. A frequent problem with portable electronic devices is that they can be easily misplaced, and if the device's notification sounds are also muffled or inaudible, finding the device can be difficult or impossible. Using GPS or wireless triangulation location information often does not provide sufficiently precise location information to enable the device to be located. However, with this location information and some information regarding the history of contexts of the device the device can deduce when the user is in possession of his telephone and when the telephone leaves his person. Thus, a context aware device finder application could provide additional information including a prior context of the device and a time of last use. For example, the context aware device finder application can tell the user that he last had possession of his telephone when he was sitting down at three o'clock on that same day and, optionally, remind the user that he was reading his email on the telephone immediately before he set it down. In another scenario, the context aware device finder application can determine that the user was in possession of his telephone in his car, and that the telephone never left the car. Such additional information can help users back track to find their devices.

In addition to providing additional useful information, context awareness can contribute to prolonging battery life by allowing more aggressive system power management. For example, by knowing that the user has not moved from his seat and has stayed close to a fixed location, a device would not need to turn on the GPS at all to maintain location services. In this example, a context aware power manager can turn off the GPS and make the assumption that available Wi-Fi connections have not changed, thereby conserving battery power without unnecessary intrusion into the user experience. As another example, when device context information indicates, with a high degree of confidence, that the user is not looking at the screen, for example the device is in a pocket, the backlight would not be turned on, even in circumstances where the backlight would normally be turned on (e.g., when a user presses a power button). An aggressive power manager can even set a very short time-out period for turning off the backlight normally; but when context suggests the user is reading the screen, the device would automatically relax the limit so as not to interfere with the user's use of the device.

While these advantages of context awareness could be implemented on an application-by-application basis, in many circumstances it will be more efficient and effective to generate context signals on a system-wide basis for a device and provide access to these context signals to multiple applications through an application program interface (API). For example, an application can register with an API library as a context listener so that the application is alerted when the context is detected or when the context changes. Alternatively, the application can query a system-wide context manager for the state of a current context. For example, a power manager application optionally registers with the system wide context manager so that when the telephone goes into a pocket it would disable the backlight when the telephone rings; similarly a ring tone application optionally checks if the telephone is in a pocket and if so the ring tone application increases the ring tone volume, so that the user is more likely to hear the ring tone even if it is muffled by the pocket.

Example Use Cases for Navigation Sensing Devices

Navigation sensing devices (e.g., human interface devices or motion tracking device) that have a determinable multi-dimensional navigational state (e.g., one or more dimensions of displacement and/or one or more dimensions of rotation or attitude) are becoming increasingly common for providing input for many different applications. For example, such a navigation sensing device may be used as a motion tracking device to track changes in position and/or orientation of the device over time. These tracked changes can be used to map movements and/or provide other navigational state dependent services (e.g., location or orientation based alerts, etc.). In some situations, pedestrian dead reckoning (PDR) is used to determine changes in position of an entity that is physically associated with a device (e.g., by combining direction of motion information for the entity with stride count and stride length information). However, in circumstances where the physical coupling between the navigation sensing device and the entity is variable, the navigation sensing device uses sensor measurements to determine both changes in the physical coupling between the navigation sensing device and the entity (e.g., a "device-to-entity orientation") and changes in direction of motion of the entity.

As another example, such a navigation sensing device may be used as a multi-dimensional pointer to control a pointer (e.g., a cursor) on a display of a personal computer, television, gaming system, etc. As yet another example, such a navigation sensing device may be used to provide augmented reality views (e.g., by overlaying computer generated elements over a display of a view of the real world) that change in accordance with the navigational state of the navigation sensing device so as to match up with a view of the real world that is detected on a camera attached to the navigation sensing device. In other situations, such a navigation sensing device may be used to provide views of a virtual world (e.g., views of portions of a video game, computer generated simulation, etc.) that change in accordance with the navigational state of the navigation sensing device so as to match up with a virtual viewpoint of the user based on the orientation of the device. In this document, the terms orientation, attitude and rotation are used interchangeably to refer to the orientation of a device or object with respect to a frame of reference. Additionally, a single navigation sensing device is optionally capable of performing multiple different navigation sensing tasks described above either simultaneously or in sequence (e.g., switching between a multi-dimensional pointer mode and a pedestrian dead reckoning mode based on user input).

In order to function properly (e.g., return results to the user that correspond to movements of the navigation sensing device in predictable ways), these applications rely on sensors that determine accurate estimates of the current state(s) associated with the device (e.g., a navigational state of the device, a user-device coupling state, a state of a user physically associated with the device and/or a state of an environment of the device) to determine user and/or device location and context. While specific use cases are described above and will be used to illustrate the general concepts described herein, it should be understood that these examples are non-limiting examples and that the embodiments described herein would apply in an analogous manner to any device that would benefit from an accurate estimate of the current state(s) associated with the device (e.g., a navigational state of the device, a user-device coupling state, a state of a user who is physically associated with the device and/or a state of an environment of the device) so as to more accurately determine user and/or device location and context.

System Overview

Attention is now directed to FIG. 1, which illustrates an example system 100 for using a navigation sensing device (e.g., a human interface device such as a multi-dimensional pointer) to manipulate a user interface. As shown in FIG. 1, an example Navigation Sensing Device 102 (hereinafter "Device 102") is coupled to a Host Computer System 101 (hereinafter "Host 101") through a wireless interface, according to some embodiments. In these embodiments, a User 103 moves Device 102. These movements are detected by sensors in Device 102, as described in greater detail below with reference to FIG. 2. Device 102, or Host 101, generates a navigational state of Device 102 based on sensor measurements from the sensors and transmits the navigational state to Host 101. Alternatively, Device 102 generates sensor measurements and transmits the sensor measurements to Host 101, for use in estimating a navigational state of Device 102. Host 101 generates current user interface data based on the navigational state of Device 102 and transmits the current user interface data to Display 104 (e.g., a display or a projector), which generates display data that is displayed to the user as the currently displayed User Interface 105. While Device 102, Host 101 and Display 104 are shown in FIG. 1 as being separate, in some embodiments the functions of one or more of these elements are combined or rearranged, as described in greater detail below with reference to FIGS. 3A-3E.

In some embodiments, an Auxiliary Device 106 also generates sensor measurements from one or more sensors and transmits information based on the sensor measurements (e.g., raw sensor measurements, filtered signals generated based on the sensor measurements or other device state information such as a coupling state of Auxiliary Device 106 or a navigational state of Auxiliary Device 106) to Device 102 and/or Host 101 via wired or wireless interface, for use in determining a state of Device 102. It should be understood that Auxiliary Device 106 optionally has one or more of the features, components, or functions of Navigation Sensing Device 102, but those details are not repeated here for brevity.

In some implementations, the user can use Device 102 to issue commands for modifying the user interface, control objects in the user interface, and/or position objects in the user interface by moving Device 102 so as to change its navigational state. In some embodiments, Device 102 is sensitive to six degrees of freedom: displacement along the x-axis, displacement along the y-axis, displacement along the z-axis, yaw, pitch, and roll. In some other situations, Device 102 is a navigational state tracking device (e.g., a motion tracking device) that tracks changes in the navigational state of Device 102 over time but does not use these changes to directly update a user interface that is displayed to the user. For example, the updates in the navigational state can be recorded for later use by the user or transmitted to another user or can be used to track movement of the device and provide feedback to the user concerning their movement (e.g., directions to a particular location near the user based on an estimated location of the user). When used to track movements of a user without relying on external location information (e.g., Global Positioning System signals), such motion tracking devices are also sometimes referred to as pedestrian dead reckoning devices.

In some embodiments, the wireless interface is selected from the group consisting of: a Wi-Fi interface, a Bluetooth interface, an infrared interface, an audio interface, a visible light interface, a radio frequency (RF) interface, and any combination of the aforementioned wireless interfaces. In some embodiments, the wireless interface is a unidirectional wireless interface from Device 102 to Host 101. In some embodiments, the wireless interface is a bidirectional wireless interface. In some embodiments, bidirectional communication is used to perform handshaking and pairing operations. In some embodiments, a wired interface is used instead of or in addition to a wireless interface. As with the wireless interface, the wired interface is, optionally, a unidirectional or bidirectional wired interface.

In some embodiments, data corresponding to a navigational state of Device 102 (e.g., raw measurements, calculated attitude, correction factors, position information, etc.) is transmitted from Device 102 and received and processed on Host 101 (e.g., by a host side device driver). Host 101 uses this data to generate current user interface data (e.g., specifying a position of a cursor and/or other objects in a user interface) or tracking information.

Figure 2:
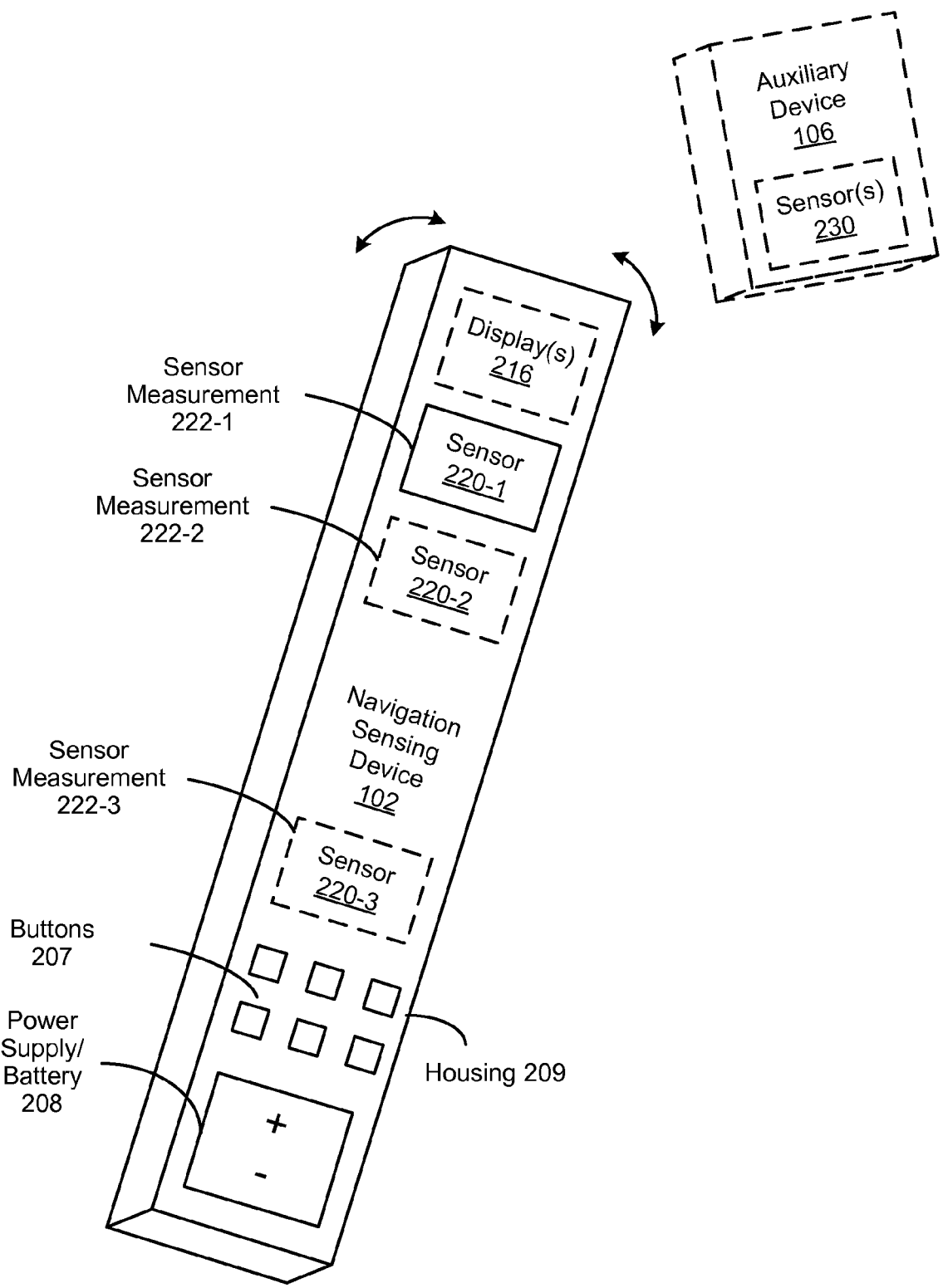
FIG. 2 is a block diagram illustrating an example navigation sensing device and auxiliary device, according to some embodiments.

Attention is now directed to FIG. 2, which illustrates an example of Device 102 and Auxiliary Device 106, according to some embodiments. In accordance with some embodiments, Device 102 includes one or more Sensors 220 which produce corresponding sensor outputs, which can be used to determine a state associated with Device 102 (e.g., a navigational state of the device, a user-device coupling state, a state of a user physically associated with the device and/or a state of an environment of the device). For example, in one implementation, Sensor 220-1 is a multi-dimensional magnetometer generating multi-dimensional magnetometer measurements (e.g., a rotation measurement), Sensor 220-2 is a multi-dimensional accelerometer generating multi-dimensional accelerometer measurements (e.g., a rotation and translation measurement), and Sensor 220-3 is a gyroscope generating measurements (e.g., either a rotational vector measurement or rotational rate vector measurement) corresponding to changes in orientation of the device. In some implementations Sensors 220 include one or more of gyroscopes, beacon sensors, inertial measurement units, temperature sensors, barometers, proximity sensors, single-dimensional accelerometers and multi-dimensional accelerometers instead of or in addition to the multi-dimensional magnetometer and multi-dimensional accelerometer and gyroscope described above. In accordance with some embodiments, Auxiliary Device 106 includes one or more Sensors 230 which produce corresponding sensor outputs, which can be used to determine a state associated with Auxiliary Device 106 (e.g., a navigational state of the device, a user-device coupling state, a state of a user physically associated with the device and/or a state of an environment of the device). In some implementations, information corresponding to the sensor outputs of Sensors 230 of Auxiliary Device 106 is transmitted to Device 102 for use in determining a state of Device 102. Similarly, in some implementations, information corresponding to the sensor outputs of Sensors 220 of Device 102 is transmitted to Auxiliary Device 106 for use in determining a state of Auxiliary Device 106. For example Device 102 is a telephone and Auxiliary Device 106 is a Bluetooth headset that is paired with the telephone, and the telephone and the Bluetooth headset share information based on sensor measurements to more accurately determine a state of Device 102 and/or Auxiliary Device 106. As another example two mobile telephones near each other can be configured to share information about their environmental context and/or their position. Additionally, a wrist watch with an accelerometer can be configured to share accelerometer measurements and/or derived posture information with a mobile telephone held by the user to improve posture estimates for the user.

In some embodiments, Device 102 also includes one or more of: Buttons 207, Power Supply/Battery 208, Camera 214 and/or Display 216 (e.g., a display or projector). In some embodiments, Device 102 also includes one or more of the following additional user interface components: one or more processors, memory, a keypad, one or more thumb wheels, one or more light-emitting diodes (LEDs), an audio speaker, an audio microphone, a liquid crystal display (LCD), etc. In some embodiments, the various components of Device 102 (e.g., Sensors 220, Buttons 207, Power Supply 208, Camera 214 and Display 216) are all enclosed in Housing 209 of Device 102. However, in implementations where Device 102 is a pedestrian dead reckoning device, many of these features are not necessary, and Device 102 can use Sensors 220 to generate tracking information corresponding changes in navigational state of Device 102 and transmit the tracking information to Host 101 wirelessly or store the tracking information for later transmission (e.g., via a wired or wireless data connection) to Host 101.

In some embodiments, one or more processors (e.g., 1102, FIG. 9) of Device 102 perform one or more of the following operations: sampling Sensor Measurements 222, at a respective sampling rate, produced by Sensors 220; processing sampled data to determine displacement; transmitting displacement information to Host 101; monitoring the battery voltage and alerting Host 101 when the charge of Battery 208 is low; monitoring other user input devices (e.g., keypads, buttons, etc.), if any, on Device 102 and, as appropriate, transmitting information identifying user input device events (e.g., button presses) to Host 101; continuously or periodically running background processes to maintain or update calibration of Sensors 220; providing feedback to the user as needed on the remote (e.g., via LEDs, etc.); and recognizing gestures performed by user movement of Device 102.

In various embodiments, data received from the one or more sensors can include motion and position data. The motion and position data may be used to track motions of the Device 102 and determine, for example, that the Device 102 is in a resting position, in a moving car, in traffic (stops, moves, stops again), in highway traffic, and so forth. Based on the state, various noise suppression models or location detection algorithms can be used.

In one embodiment, Device 102 moves caused by the user (e.g. to answer a call, type a text message, and so forth) can hinder motion tracking. As a result, a wrong motion state can be determined, location detection can be affected, and so on. To avoid this, motions resulting from user interactions with the Device 102 can be filtered out using a method for enhancing motion tracking.

As would be readily appreciated by one of ordinary skill in the art, different combinations and permutations of types of sensors can be used to ascertain motion. According to some example embodiments, the combinations and permutations of sensors used to ascertain motion can be selected such that the set of sensors employed consume less power than a GPS receiver.

For example, a new location can be determined based in part on the initial location, and a direction and distance traveled from the initial location (e.g., pedestrian dead reckoning). By way of example and not limitation, combinations and permutations of sensors can determine that a vehicle has made a U-turn and traveled a quarter mile from the initial location in order to calculate a new location. As would be readily appreciated by one of ordinary skill in the art, GPSs may not immediately detect U-turns, whereas others sensor(s) may. By way of further example, if the mobile device is determined to be in proximity of a specific surface irregularity (e.g., a bump in the road and/or upward/downward sloping road), the location of the mobile device can be updated based on other sensor data. In some embodiments, the mobile device may use a map to determine the new location.

In some embodiments, the one or more sensors are removably attached to the Device 102, for example, via a USB port or otherwise. The one or more sensors can be integrated into an add-on unit, such as, for example, a low-power sensor-fusion hub. Alternatively, the one or more sensors can be permanently attached to the Device 102.

In an exemplary embodiment for enhancing motion tracking, the Device 102, e.g., a mobile device, can include one or more sensors, such as, for example, a gyroscope, magnetometer, accelerometer, pressure sensor, and so forth. The sensors can sense motions, orientation, and position of the mobile device. The sensor data indicative of motions of the mobile device can be received from the sensors. The sensor data can be processed by the processor to track motions of the mobile device and to determine motion states of the mobile device.

In various embodiments, the interaction data indicative of user interactions with the mobile device can be received. The interaction data can include a call answered by the user, texting by the user, activation of an application on the mobile device, and so forth. When the user interacts with the mobile device, data associated with such interactions can be fetched from the mobile device and, subsequently, accounted for by the motion tracking algorithm.

In other embodiments, the motion tracking of the mobile device can be adjusted based on the interaction data. The interaction data can be used to filter out the movements associated with the user interactions and considered to be movement "noise" by the motion tracking algorithm.

In some embodiments, a threshold is defined for filtering out movements associated with the user interactions. When the threshold is exceeded, motion tracking is tuned and adjusted to only keep the data representing clear indications of new motion states. For example, movements associated with a vehicle coming to a stop or a user starting to walk are not filtered out, but those associated with a user answering a call when driving are filtered out. In various embodiments, cues aid motion tracking in knowing which sensors to use and not to use, in order to make a better decision of the motion state.

Thus, various cues can be used to determine motion states with more precision. Based on the interaction data, specific sensors from the one or more sensors can be activated or deactivated. For example, when it is determined that the user is located in a moving car and makes a telephone call (has moved the phone to make the call), this information can be used as a cue for the motion tracking to make a better state decision. Accordingly, movements associated with making the phone call can be disregarded.

A change in motion states can be used for various purposes and by various applications or services associated with the mobile device. For example, the motion state can be used by an audio noise suppression utility to select a suitable noise suppression model during a call. Thus, ambient noise can be efficiently suppressed both for one or more participants of the phone call.

Additionally, for a wearable device, such as a "lifelog" device, pedometer, a sport tracker, FITBIT, a mobile phone used as a pedometer, and the like, the method for enhancing motion tracking of the mobile device can improve tracking accuracy. User actions can be determined with a higher level of certainty and sport tracking can be adjusted accordingly, for example, to determine that the user is going up the stairs.

According to an example use case, the mobile phone is being used for texting. Information associated with this interaction is provided as a cue to the motion tracking system of the mobile device. In various embodiments, sensor information indicative of the phone being used for texting, e.g., indicating the user is likely not running, can be provided as cue to motion algorithm of mobile device or wearable. Based on the one or more cues, corresponding adjustments can be made, for example, the motion tracking system can adjust health information and/or parameters, adjust audio noise suppression parameters, and so forth.

Attention is now directed to FIGS. 3A-3E, which illustrate configurations of various components of the system for generating navigational state estimates for a navigation sensing device. In some embodiments, there are three fundamental components to the system for determining a navigational state of a navigation sensing device described herein: Sensors 220, which provide sensor measurements that are used to determine a navigational state of Device 102, Measurement Processing Module 322 (e.g., a processing apparatus including one or more processors and memory) which uses the sensor measurements generated by one or more of Sensors 220 to generate estimates of the navigational state of Device 102 which can be used to determine current user interface data and/or track movement of Device 102 over time (e.g., using pedestrian dead reckoning), and, optionally, Display 104, which displays the currently displayed user interface to the user of Device 102 and/or information corresponding to movement of Device 102 over time. It should be understood that these components can be distributed among any number of different devices.

In some embodiments, Measurement Processing Module 322 (e.g., a processing apparatus including one or more processors and memory) is a component of the device including Sensors 220. In some embodiments, Measurement Processing Module 322 (e.g., a processing apparatus including one or more processors and memory) is a component of a computer system that is distinct from the device including Sensors 220. In some embodiments a first portion of the functions of Measurement Processing Module 322 are performed by a first device (e.g., raw sensor data is converted into processed sensor data at Device 102) and a second portion of the functions of Measurement Processing Module 322 are performed by a second device (e.g., processed sensor data is used to generate a navigational state estimate for Device 102 at Host 101).

Figure 3A:
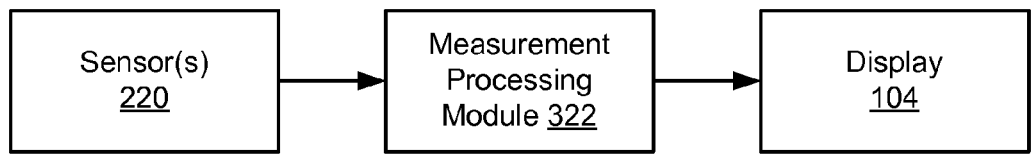
FIGS. 3A-3E are block diagrams illustrating configurations of various components of the system including a navigation sensing device, according to some embodiments.
Figure 3B:
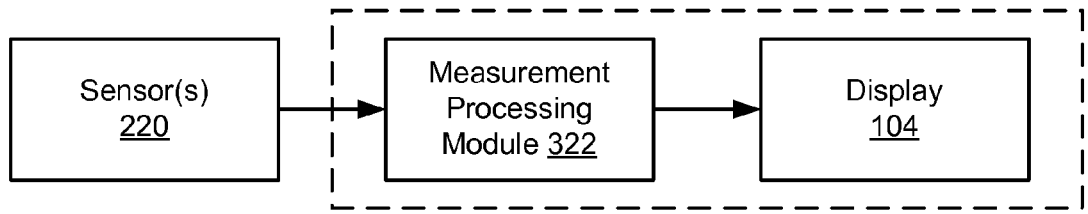
Figure 3C:
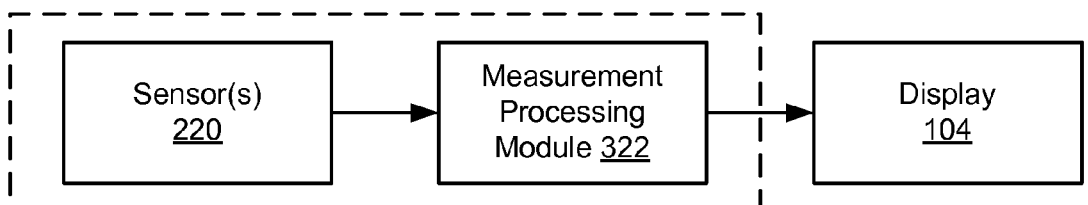

As one example, in FIG. 3A, Sensors 220, Measurement Processing Module 322 and Display 104 are distributed between three different devices (e.g., a navigation sensing device such as a multi-dimensional pointer, a set top box, and a television, respectively; or a motion tracking device, a backend motion processing server and a motion tracking client). As another example, in FIG. 3B, Sensors 220 are included in a first device (e.g., a multi-dimensional pointer or a pedestrian dead reckoning device), while the Measurement Processing Module 322 and Display 104 are included in a second device (e.g., a host with an integrated display). As another example, in FIG. 3C, Sensors 220 and Measurement Processing Module 322 are included in a first device, while Display 104 is included in a second device (e.g., a "smart" multi-dimensional pointer and a television respectively; or a motion tracking device such as a pedestrian dead reckoning device and a display for displaying information corresponding to changes in the movement of the motion tracking device over time, respectively).

Figure 3D:
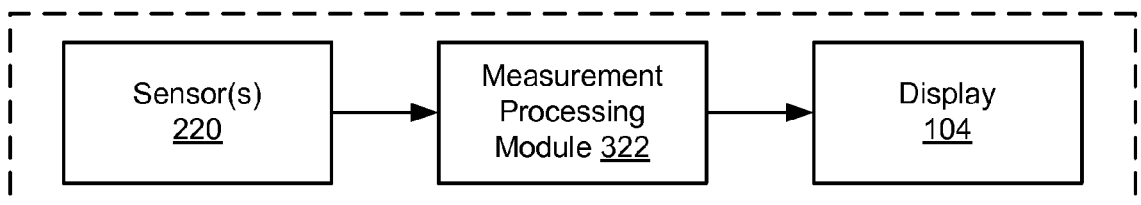
Figure 3E:
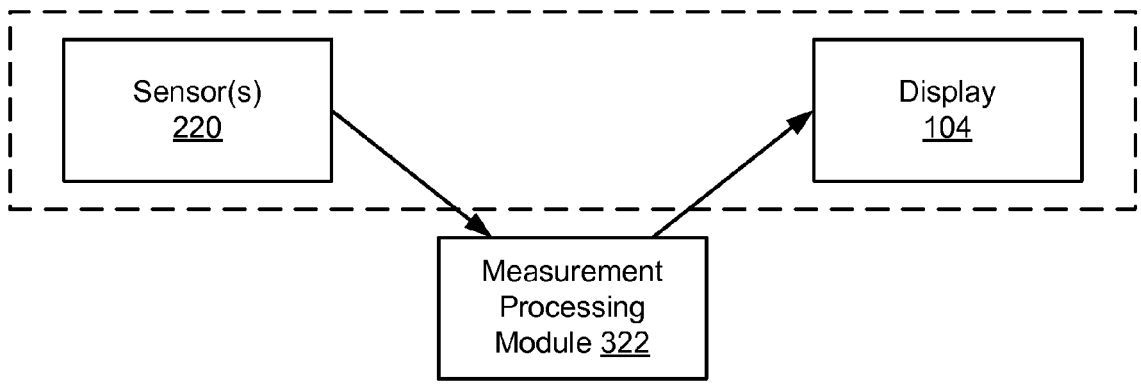

As yet another example, in FIG. 3D, Sensors 220, Measurement Processing Module 322 and Display 104 are included in a single device (e.g., a mobile computing device, such as a smart telephone, personal digital assistant, tablet computer, pedestrian dead reckoning device etc.). As a final example, in FIG. 3E, Sensors 220 and Display 104 are included in a first device (e.g., a game controller with a display/projector), while Measurement Processing Module 322 is included in a second device (e.g., a game console/ server). It should be understood that in the example shown in FIG. 3E, the first device will typically be a portable device (e.g., a smart telephone or a pointing device) with limited processing power, while the second device is a device (e.g., a host computer system) with the capability to perform more complex processing operations, or to perform processing operations at greater speed, and thus the computationally intensive calculations are offloaded from the portable device to a host device with greater processing power. While a plurality of common examples have been described above, it should be understood that the embodiments described herein are not limited to the examples described above, and other distributions of the various components could be made without departing from the scope of the described embodiments.

Determining Context Information

Figure 4:
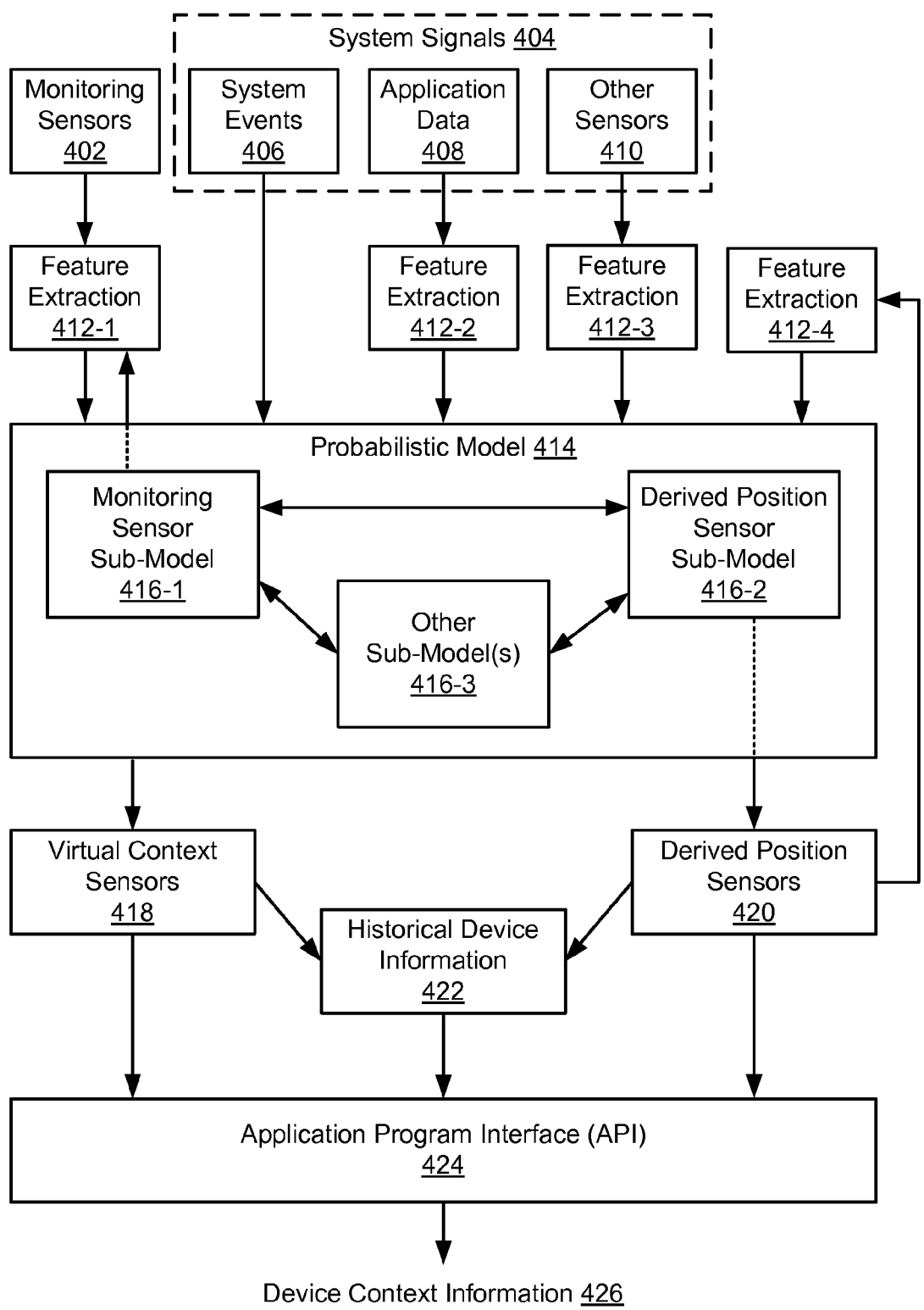
FIG. 4 includes a diagram illustrating an example of combining monitoring sensor measurements and system signals to determine device context, according to some embodiments.

Attention is now directed to FIG. 4, which includes a block diagram illustrating an example of combining monitoring sensor measurements and system signals to determine device context, in accordance with some embodiments. In some embodiments, when a user is using a device, the device context can be used to determine a context of the user (e.g., if the context of the device indicates that a device held by a user is attached to a running person, then the context of the user is that the user is running). FIG. 4 illustrates an overview of a system for combining monitoring sensor measurements and system signals to determine device context. A processing apparatus obtains (e.g., based on sensor measurements of sensors associated with the device or an auxiliary device associated with the device) monitoring sensor measurements from Monitoring Sensors 402 and System Signals 404. In some implementations System Signals 404 include representations of System Events 406 (e.g., power on/off, plugged in state), representations of Application Data 408 (e.g., calendar, browsing history, telephone call history, check-ins) and sensor measurements from Other Sensors 410 (e.g., sensors other than Monitoring Sensors 402. In the example shown in FIG. 4, the processing apparatus includes Feature Extractors 412 for extracting features from Monitoring Sensors 402, System Signals 404 and other received or derived inputs.

In some embodiments, the extracted features corresponding to these various sources are combined by a Probabilistic Model 414 (e.g., a Markov Model). In some implementations, Probabilistic Model 414 includes one or more Sub-Models 416 that correspond to different sources of information. For example, in FIG. 4, there is a Monitoring Sensor Sub-Model 416-1 that corresponds to device coupling states that are determined based on features extracted from sensor measurements of Monitoring Sensors 402, where Monitoring Sensor Sub-Model 416-1 optionally provides feedback to Feature Extraction Module 412-1 to adjust the rate and/or type of features generated by Feature Extraction Module 412-1. Similarly, in FIG. 4, there are other sub-models, such as a Derived Position Sensor Sub-Model 416-2 that models a position of the device based on inputs from the Monitoring Sensors 402 and System Signals 404, and provides estimates of device position that are augmented by information other than directly measured position information. For example, absolute device position information from GPS or wireless triangulation is augmented with relative device position information such as pedestrian dead reckoning, inertial movement tracking, device check-ins or other input sources. In implementations where there are multiple Sub-Models 416 in Probabilistic Model 414, the sub-models optionally include one or more shared states and/or one or more linked states and thus the various sub-models can influence other sub-models directly or indirectly.

In FIG. 4, Probabilistic Model 414 generates information (e.g., state probabilities) that can be used by context aware applications to operate in accordance with changing contexts at the device. For example, the device uses the outputs of Probabilistic Model 414 to generate Virtual Context Sensors 418 and Derived Position Sensors 420 (e.g., based on information from Derived Position Sensor Sub-Model 416-2). In some implementations some or all of the virtual context sensor information and derived position sensor information is stored at the device as Historical Device Information 422 for a predefined time period (e.g., 1 hour, 1 day, or some other reasonable period of time). This Historical Device Information 422 enables a context aware application to search the historical device information (e.g., to find a context of the device at a last time that the user was in possession of the device) and/or retrieve device context and/or device position information from a specified time period. For example, a context aware application that was inactive (e.g., suspended or off), can request information identifying changes in device context or location since the last time the application was active. This contextual information, including "sensor outputs" from Virtual Context Sensor 418, "sensor outputs" from Derived Position Sensors 420 and Historical Device Information 422 is, optionally, made available via Application Program Interface (API) 424, which provides a standard, documented, interface for third-party applications to access Device Context Information 426. Additional details related to the determination of device context information are described with reference to FIGS. 4A-4C of U.S. patent application Ser. No. 14/090, 966, which is hereby incorporated by reference in its entirety.

Figure 5A:
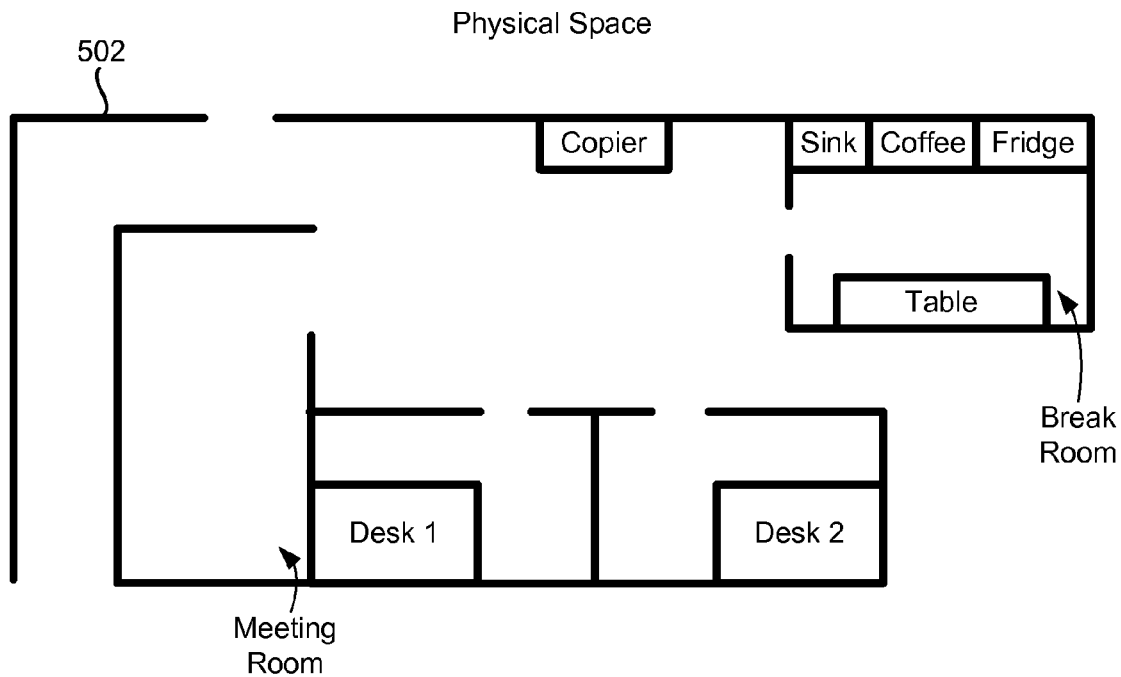
FIGS. 5A-5J are diagrams of a method for generating a mapping of a physical space based on traversal of the physical space by one or more devices moving between contexts, according to some embodiments.
Figure 5B:
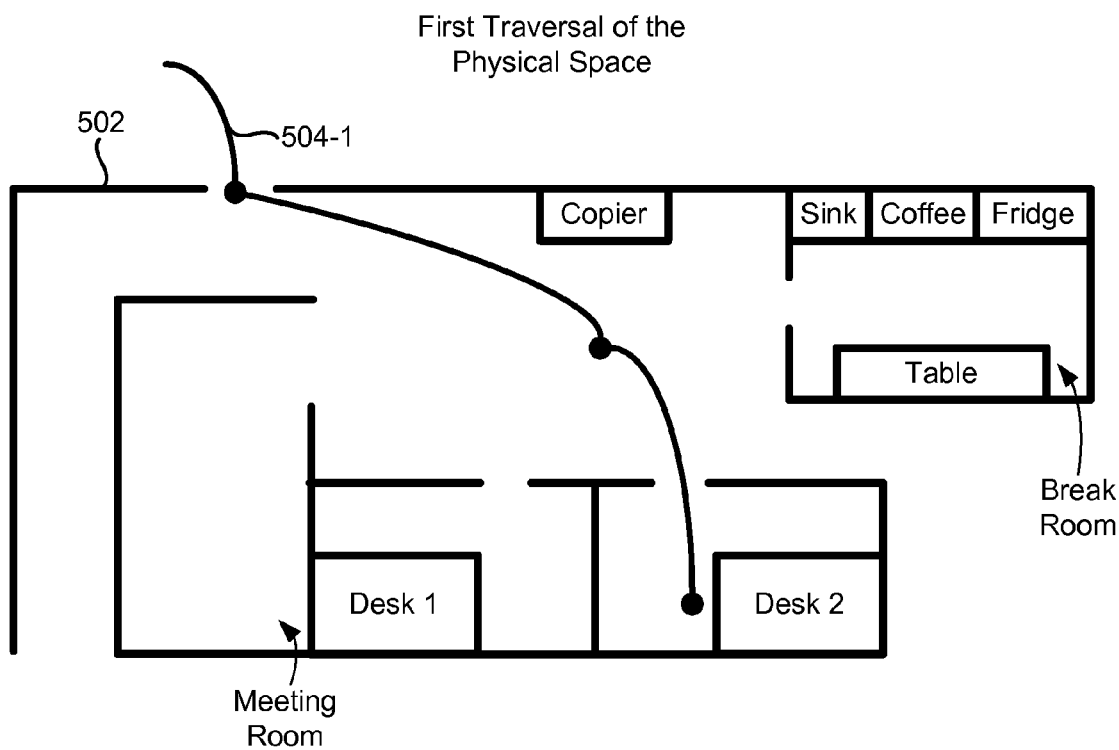
Figure 5C:
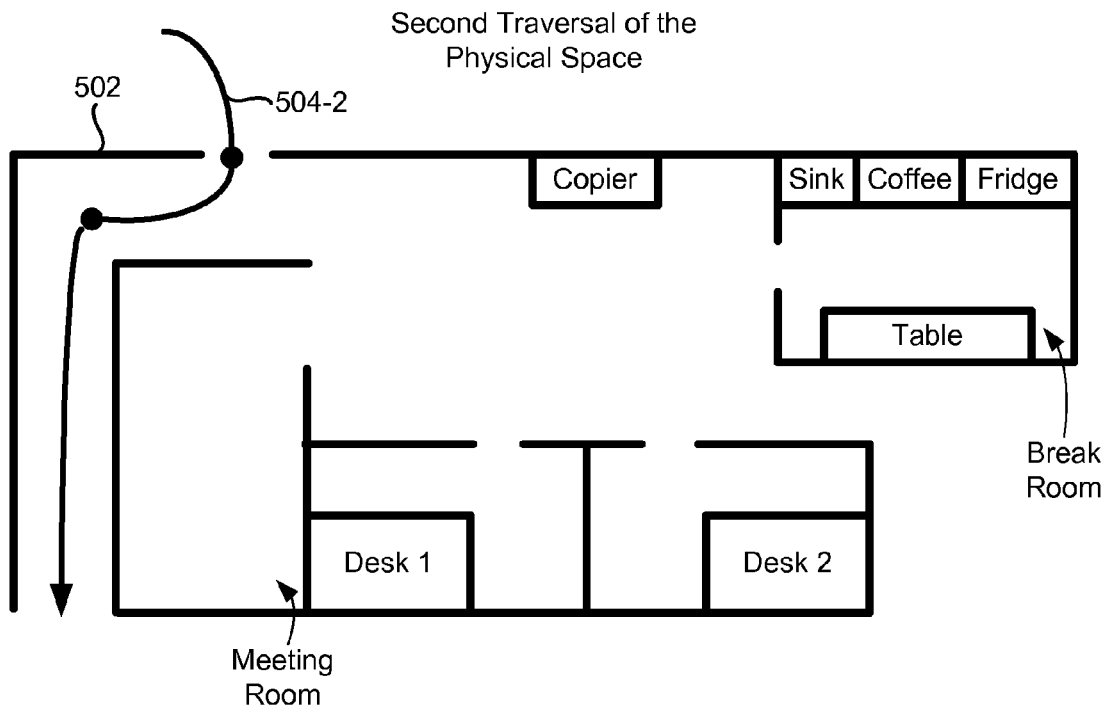
Figure 5D:
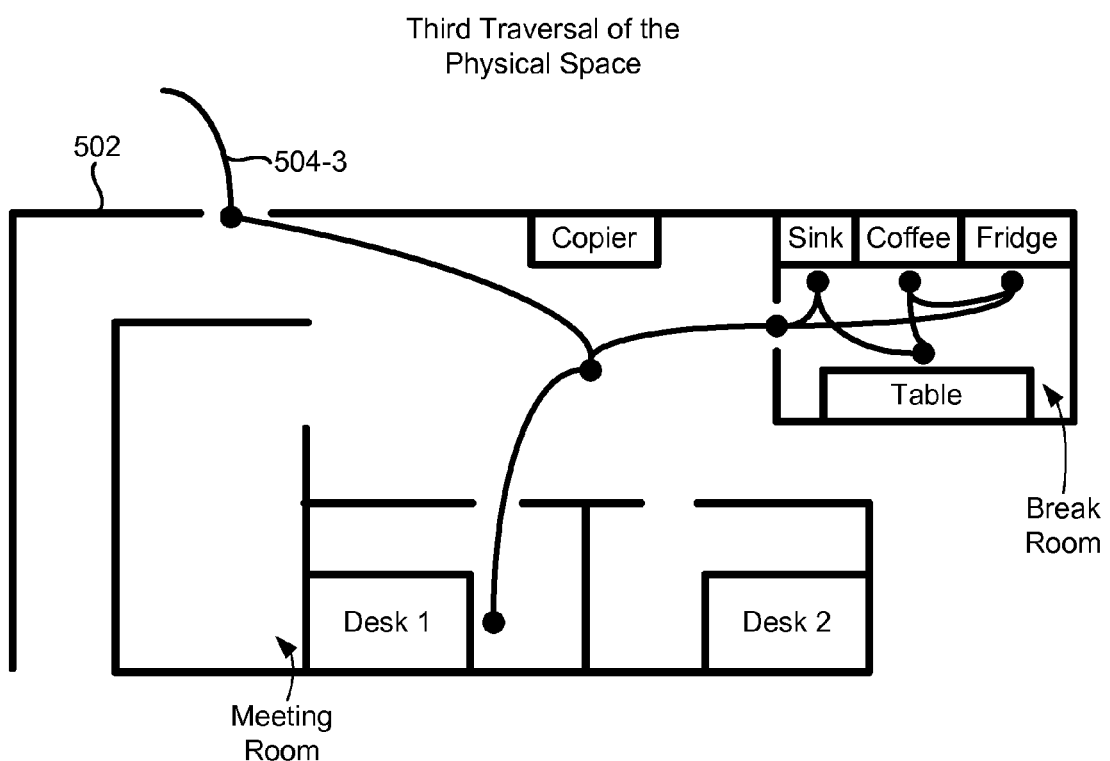

Attention is now directed to FIGS. 5A-5J, which illustrate generating a mapping of a physical space based on traversal of the physical space by a device moving between contexts, in accordance with some embodiments. FIGS. 5A-5E show a representation of Physical Space 502 that includes a number of hallways; a copier; a break room with a sink, coffee machine, fridge, and table; and two offices, each with a desk. FIG. 5B shows Movement 504-1 of a user from an entrance/door for Physical Space 502 to a group meeting space in the middle of the hallway and then to Desk 2, this movement is detected based on detecting movement of one or more devices (e.g., Navigation Sensing Device 102 and/or Auxiliary Device 106) associated with the user through the physical space with one or more sensors of the one or more devices. FIG. 5C shows Movement 504-2 of a user (e.g., the same user or a different user than the user that moved through the physical space in FIG. 5B) from an entrance/door into a hallway and making a left turn to go down the hallway, this movement is detected based on detecting movement of one or more devices (e.g., a Navigation Sensing Device 102 and/or Auxiliary Device 106) associated with the user through Physical Space 502 with one or more sensors of the one or more devices. FIG. 5D shows Movement 504-3 of a user (e.g., the same user or a different user than the user that moved through the physical space in FIGS. 5B and 5C) from an entrance/door into a group meeting space in the middle of the hallway, then to a door of the break room, to the fridge, from the fridge to the coffee maker and then to the table; after leaving the table, the user walks to the sink, back to the door of the break room and passes through the group meeting space on the way to Desk 1. In some embodiments, the transitions between the different locations in Physical Space 502 shown in FIGS. 5A-5D are detected by one or more of the devices (e.g., a Navigation Sensing Device 102 and/or Auxiliary Device 106) based on sensor measurements which identify different contexts (e.g., detecting a sudden turn by a user or detecting the user stop and open a door of the fridge or stop in front of a coffee machine while the coffee machine is making noises that are recognizable as originating from the coffee machine). In some embodiments, the devices also record information about the movement (e.g., the path, distance, etc.) of the user between contexts to get an indication of the relative location of the different identified contexts. Additional details of determining a context of a user are described in greater detail below with reference to method 800.

Figure 5E:
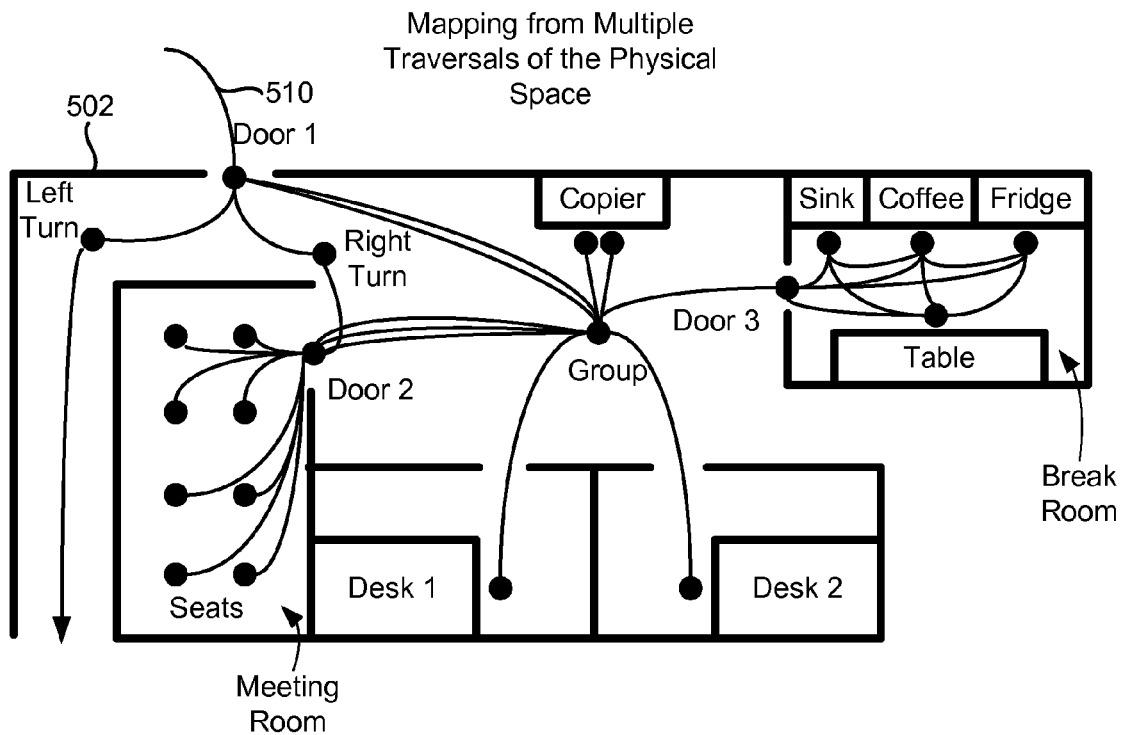

The information about the different contexts in the physical space and the relative location of the different identified contexts is collected for a number of traversals of the physical space by one or more users. In some embodiments two or three traversals are sufficient to start generating at least a preliminary mapping of the physical space. In some embodiments, a larger number of traversals (e.g., 10, 20, 30, or 100 traversals) are used to generate a mapping of the physical space. FIG. 5E shows the combined information from multiple traversals of the physical space used to generate Mapping 510 of Physical Space 502 that includes a plurality of nodes (black dots) and links (lines between the black dots). As shown in FIG. 5E, the combined information includes information identifying more contexts than were identified in any one of the example traversals shown in FIGS. 5B-5D. Thus, the combined information is able to provide a more complete mapping of the physical space by using information from a larger number of traversals. However, in some circumstances combining information from a large number of traversals will result in duplicate links between two different contexts, as shown in FIG. 5E, where there are two links between Door 1 and the Group meeting space and three links between Door 2 and the Group meeting space. In some embodiments, duplicate links are collapsed into a single link in the mapping, as shown in the simplified Mapping 512 in FIG. 5F. Similarly, in some circumstances combining information from a large number of traversals will result in duplicate nodes for one or more of the contexts, as shown in FIG. 5E, where there are two nodes corresponding to the copier. In some embodiments, duplicate nodes are collapsed into a single node in the mapping, as shown in the simplified Mapping 512 in FIG. 5F. Additional details of generating mappings are described in greater detail below with reference to method 600.

Figure 5F:
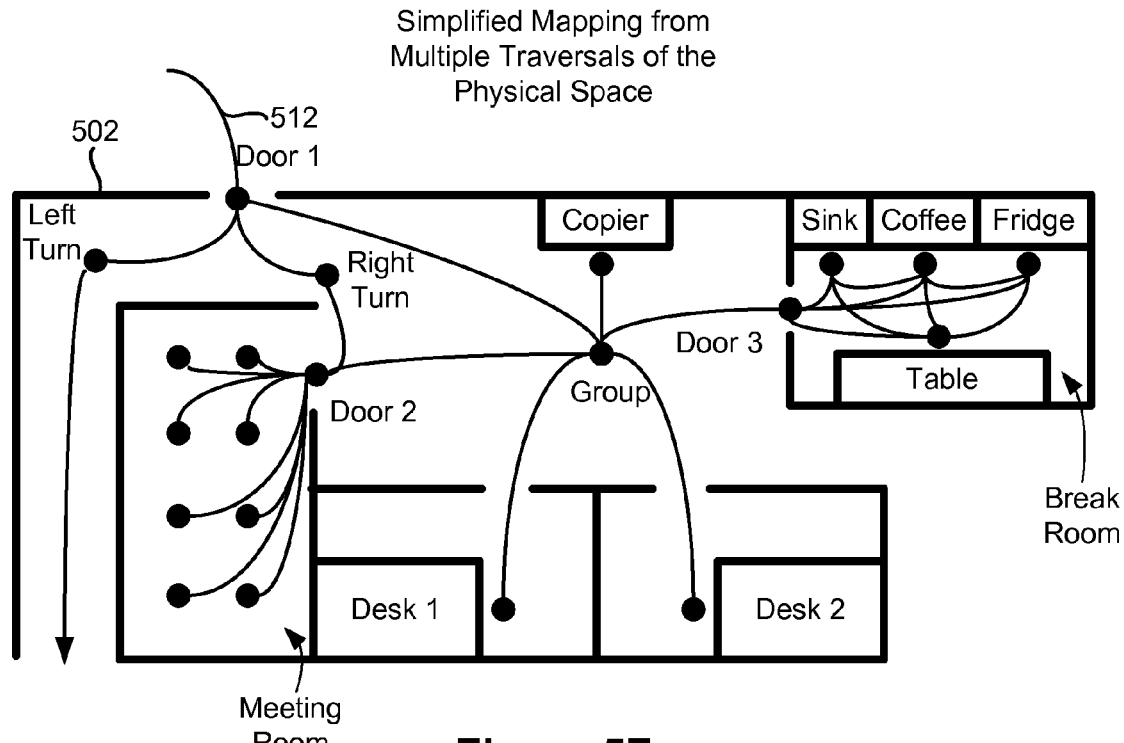

The mappings (e.g., Mapping 510 and Mapping 512) shown in FIGS. 5E and 5F are Cartesian mappings where the placement of the nodes relative to each other corresponds to the location of the contexts in the physical space. Cartesian mappings provide valuable information about the relative location of the nodes and thus can provide information about the shape or direction of a path between two nodes, including nodes that are not directly connected by a link. However, non-Cartesian mappings can also be used to present information about the physical space and are frequently a more efficient form of storing the mapping information, because the information on the two-dimensional location of the different nodes does not need to be stored. Instead, a distance between one or more pairs of nodes can be stored to provide information about a scale of the mapping without storing precise two-dimensional locations of the different nodes.

Figure 5G:
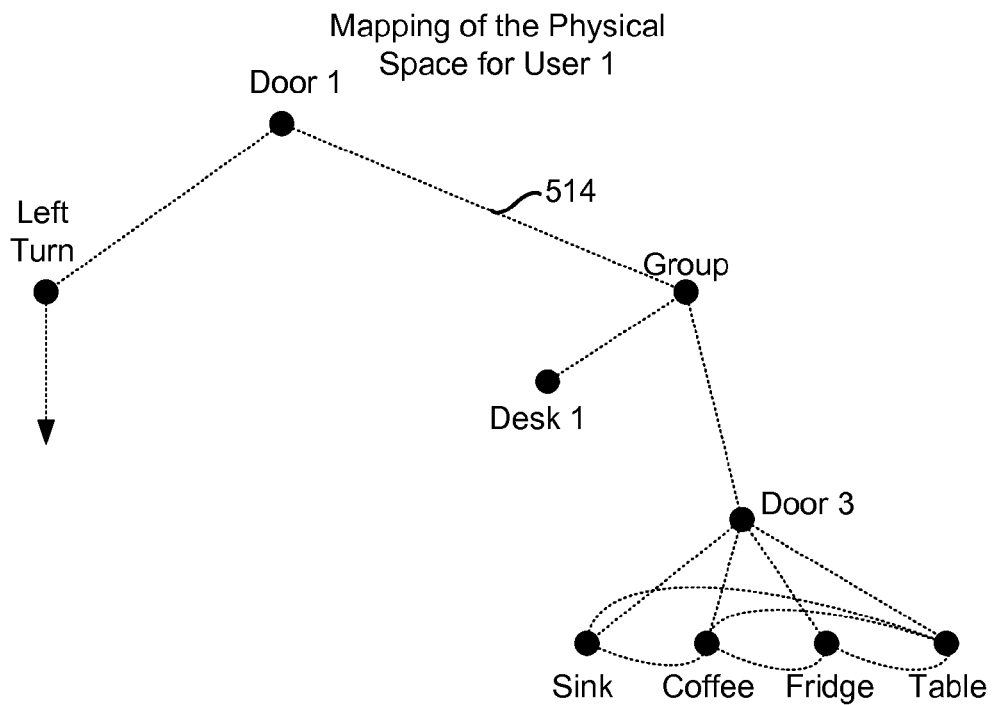
Figure 5H:
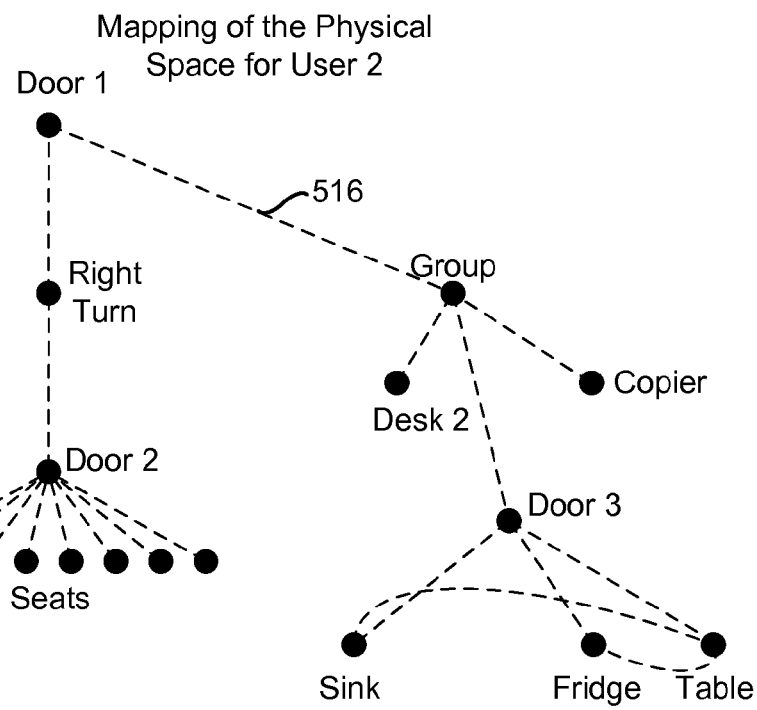
Figure 5I:
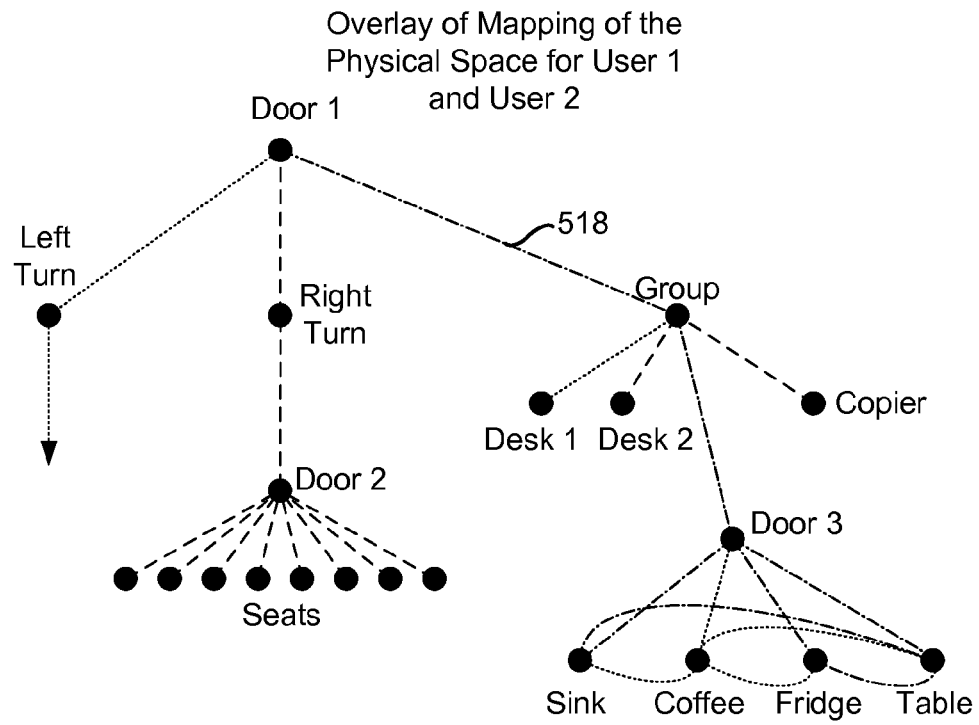
Figure 5J:
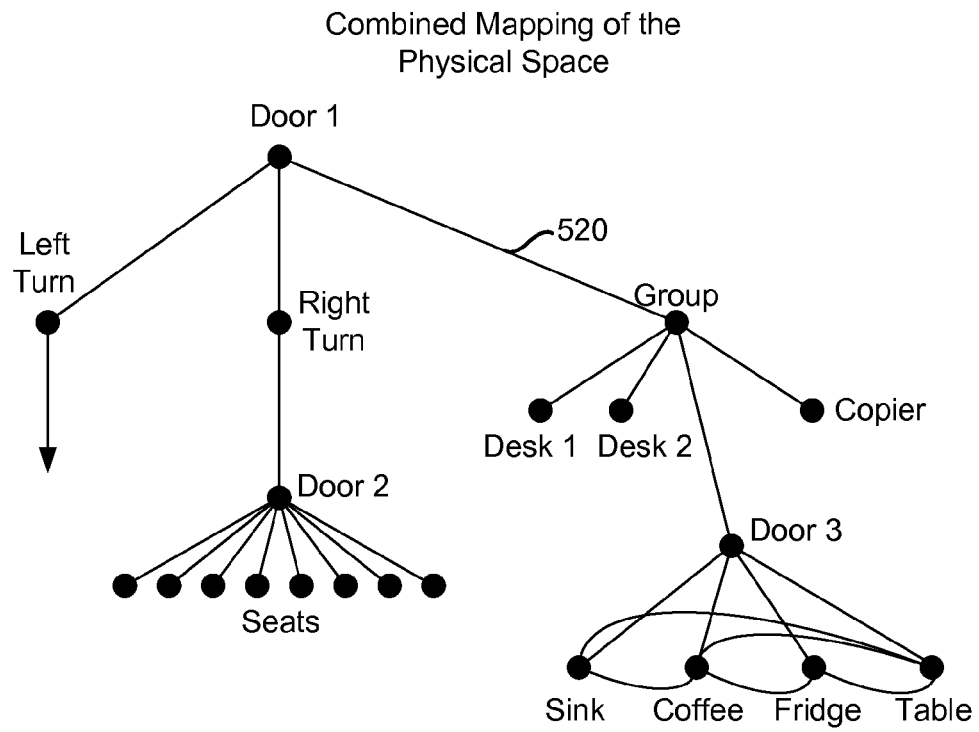
Figure 6A:
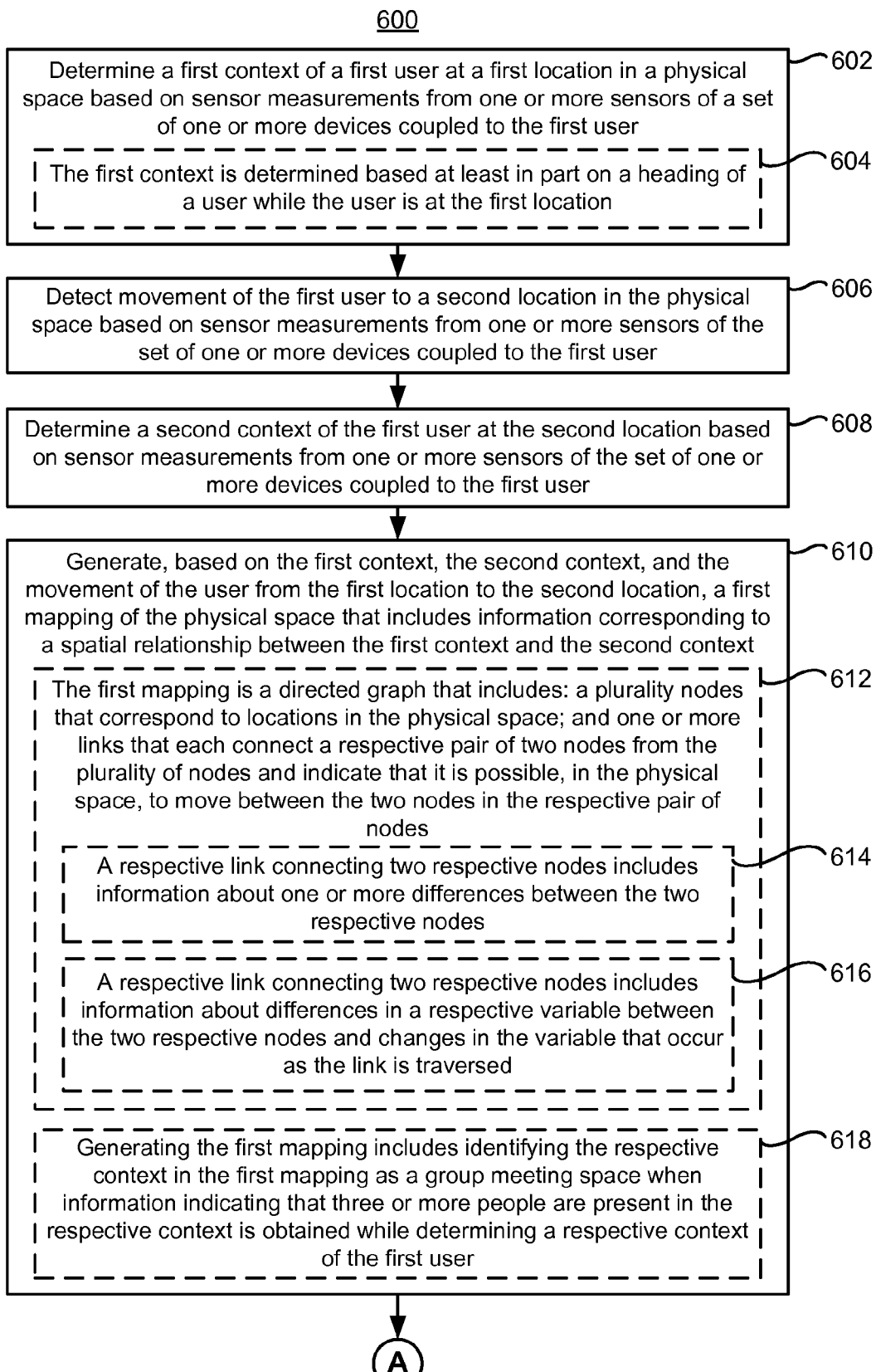
FIGS. 6A-6D are flow diagrams of a method for determining a spatial relationship between different user contexts, according to some embodiments.
Figure 6B:
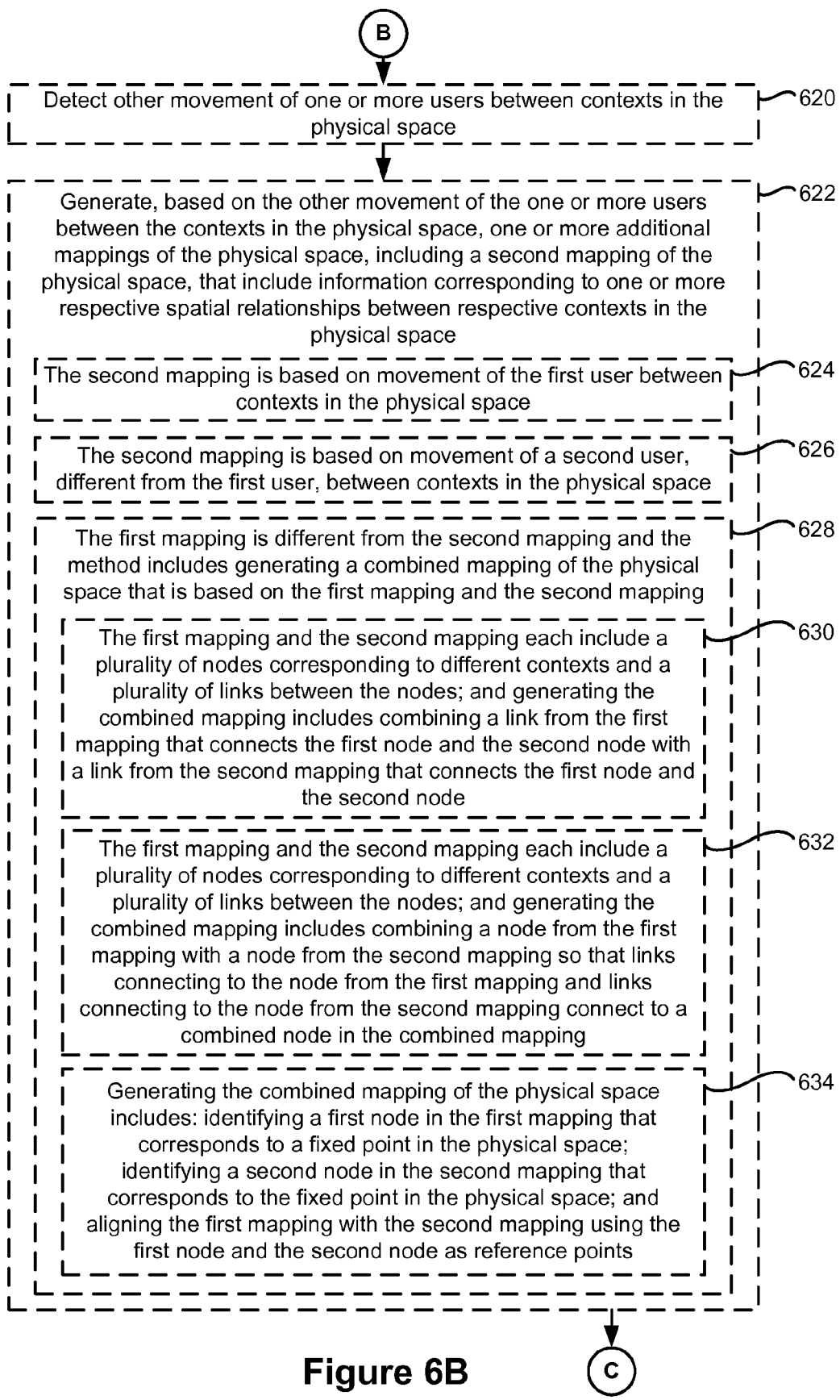
Figure 6C:
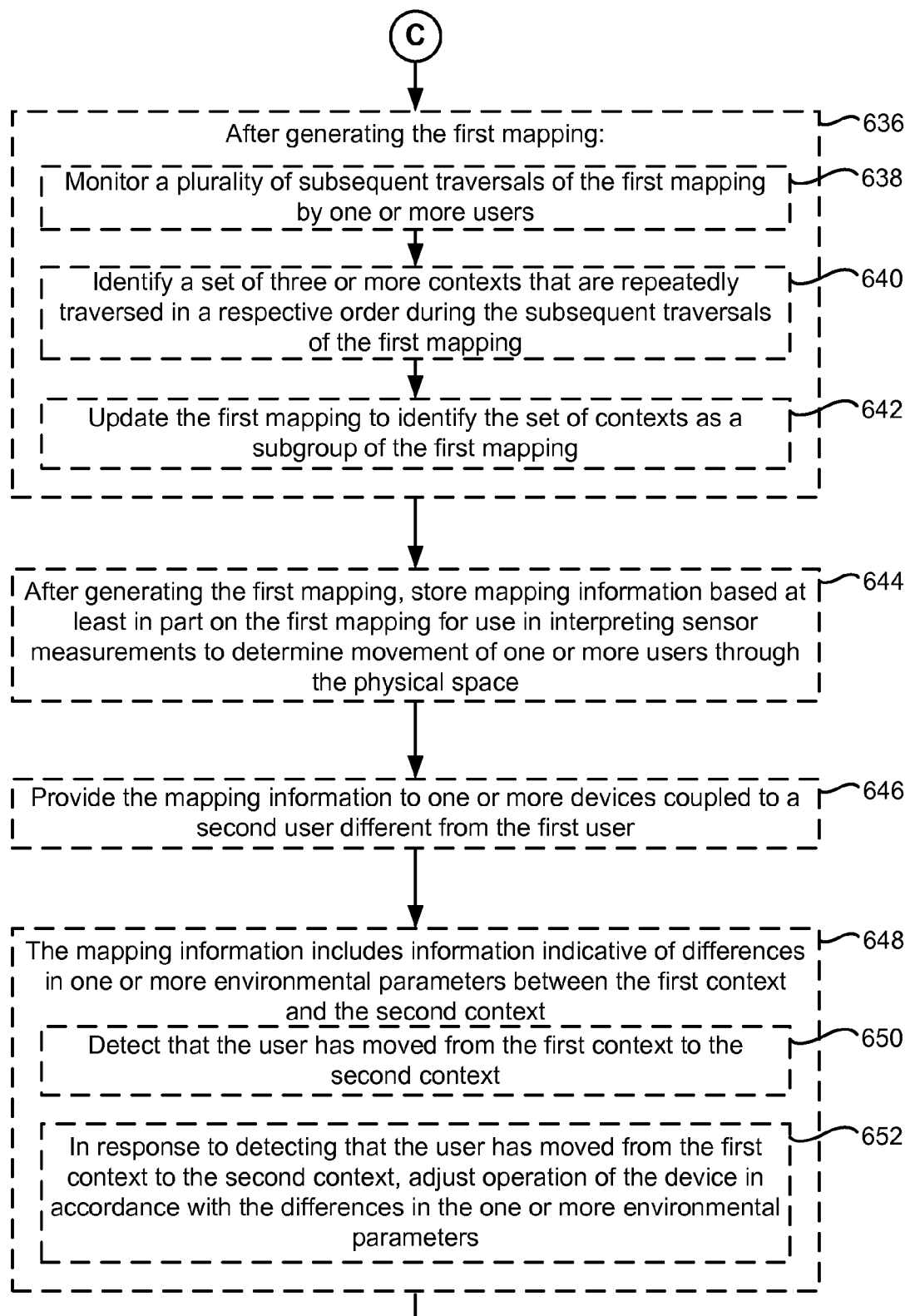
Figure 6D:
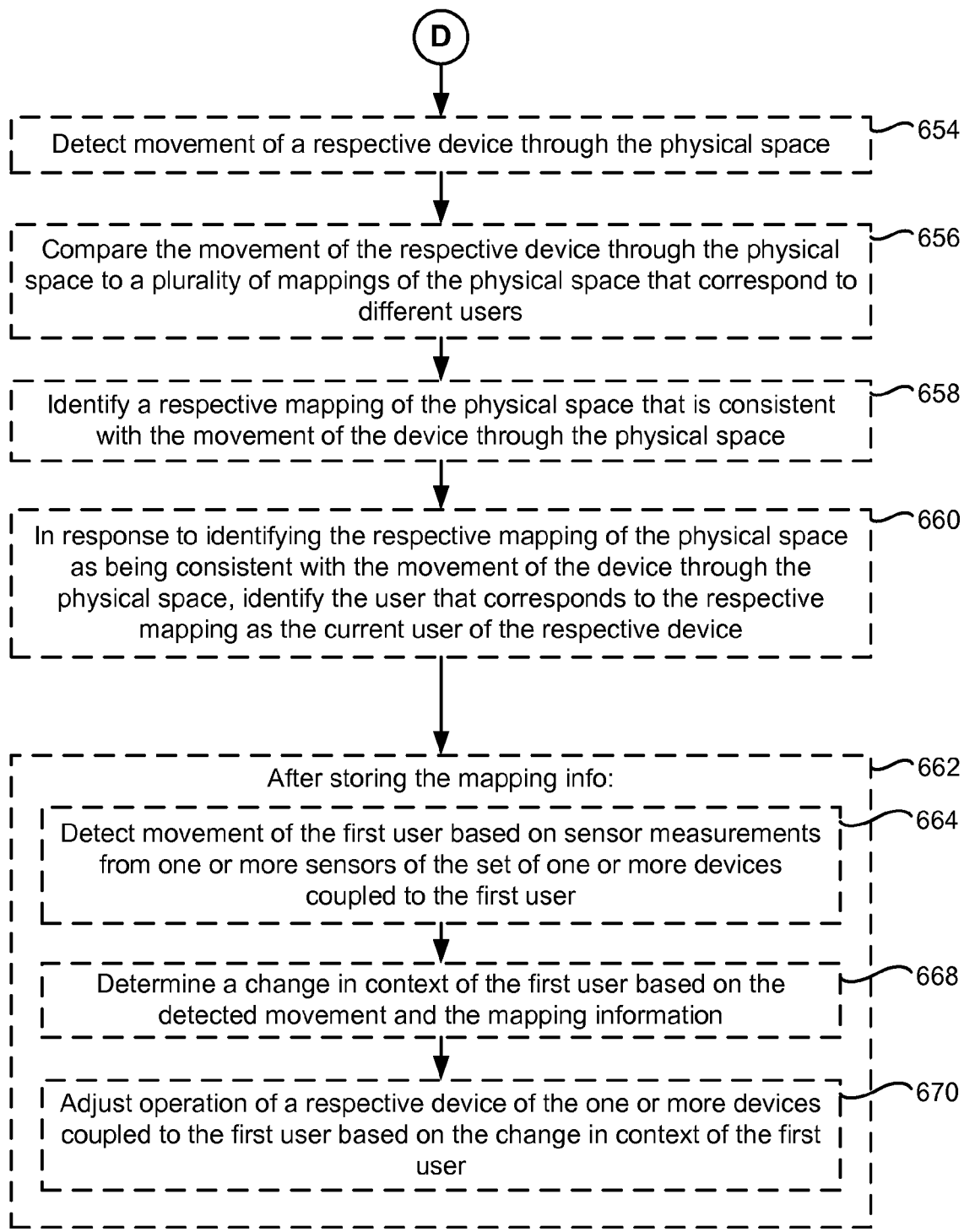

FIG. 5G shows a non-Cartesian Mapping 514 of Physical Space 502 shown in FIG. 5A, for example Mapping 514 that was generated based on traversal of the physical space by a first user (User 1), who works at Desk 1 in the physical space. Note that Mapping 514 based on traversal of the physical space by the first user shown in FIG. 5G does not include all of the nodes, because the first user does not necessarily traverse all areas of the physical space (e.g., the first user does not go into the office with Desk 2 or into the meeting room with the seats). FIG. 5H shows a non-Cartesian Mapping 516 of Physical Space 502 shown in FIG. 5A, for example Mapping 516 was generated based on traversal of the physical space by a second user (User 2), who works at Desk 2 in Physical Space 502. Note that Mapping 516 based on traversal of the physical space by the second user (User 2) shown in FIG. 5H does not include all of the nodes, because the second user does not necessarily traverse all areas of Physical Space 502 (e.g., the second user does not go into the office with Desk 1 or to the coffee machine in the break room). Additional details of generating mappings are described in greater detail below with reference to method 600.

In some embodiments, mappings of two or more users are combined to generate a combined mapping. For example, in FIG. 5I, Mapping 514 based on activity of the first user from FIG. 5G and Mapping 516 based on activity of the second user from FIG. 5H are overlaid by aligning Door 1 (which is the entrance to the physical space) in both of the mappings to generate a Merged Mapping 518. In some embodiments, this results in duplicated links or nodes, which are collapsed as described above with reference to FIGS. 5E and 5F. In some embodiments, the mappings are linked using a shared node (e.g., the entrance to the physical space, Door 1) and any duplicated links and nodes are collapsed to generate Combined Mapping 520, Combined Mapping 520 of Physical Space 502 is made available for use by other devices (e.g., as described below with reference to method 700). A mapping such as Combined Mapping 520 shown in FIG. 5J can be used in a number of different ways. For example, the mapping can be used to verify the location of a user (e.g., because the device detects a context that corresponds to one of the contexts in the mapping). The mapping can also be used to track movement of a user through Physical Space 502, by using transitions between a sequence of two or more different contexts to identify a portion of Combined Mapping 520 that the user is traversing (e.g., a portion of the mapping that includes links between the same sequence of two or more different contexts).

Attention is now directed to FIGS. 6A-6D, which illustrate a method 600 for determining a spatial relationship between different user contexts, in accordance with some embodiments. Method 600 is, optionally, governed by instructions that are stored in a non-transitory computer readable storage medium and that are executed by one or more processors of one or more computer systems (e.g., Device 102, FIG. 9 or Host 101, FIG. 10). Each of the operations shown in FIGS. 6A-6D typically corresponds to instructions stored in a computer memory or non-transitory computer readable storage medium (e.g., Memory 1110 of Device 102 in FIG. 9 or Memory 1210 of Host 101 in FIG. 10). The computer readable storage medium optionally (and typically) includes a magnetic or optical disk storage device, solid state storage devices such as Flash memory, or other non-volatile memory device or devices. The computer readable instructions stored on the computer readable storage medium typically include one or more of: source code, assembly language code, object code, or other instruction format that is interpreted or executed by one or more processors. In various embodiments, some operations in method 600 are combined and/or the order of some operations is changed from the order shown in FIGS. 6A-6D.

The following operations are performed at a processing apparatus having one or more processors and memory storing one or more programs that, when executed by the one or more processors, cause the respective processing apparatus to perform the method. In some embodiments, the processing apparatus is a component of Device 102 (e.g., the processing apparatus includes the one or more CPU(s) 1102 in FIG. 9). In some embodiments, the processing apparatus is separate from Device 102 (e.g., the processing apparatus includes the one or more CPU(s) 1202 of a host system 101, an example of which is shown in FIG. 10).

The processing apparatus determines (602) a first context of a first user at a first location in a physical space based on sensor measurements from one or more sensors of a set of one or more devices coupled to the first user (e.g., one or more smartphones and/or one or more activity monitors). In some embodiments, the first context is determined (604) based at least in part on a heading of a user while the user is at the first location (e.g., if the user stops and performs a motion that has the characteristics of opening a door while facing perpendicular to a wall, the user is likely opening a door).

The processing apparatus detects (606) movement of the first user to a second location in the physical space based on sensor measurements from one or more sensors of the set of one or more devices coupled to the first user and determines (608) a second context of the first user at the second location based on sensor measurements from one or more sensors of the set of one or more devices coupled to the first user (e.g., detecting movement such as Movement 504 in FIGS. 5B-5D). After detecting movement of the first user to the second location and determining the second context, the processing apparatus generates, (610) based on the first context, the second context, and the movement of the user from the first location to the second location, a first mapping of the physical space that includes information corresponding to a spatial relationship between the first context and the second context (e.g., Mapping 510 in FIG. 5E or Mapping 514 in FIG. 5G). In some embodiments, the mapping is not a Cartesian mapping but is rather a mapping (e.g., Mapping 514 in FIG. 5G) that provides information about a relationship between different locations/contexts in the mapping without providing information about the different locations relative to a common coordinate system. In some embodiments, the first context and the second context include one or more of: a door opening (requiring a person to heave/yank open a heavy door followed by passage through it), turns to the right or left of, say, 90 degrees (walking with small radius of curvature—say 1-2 meters), a copier (where a person walks up to a point, and waits at the location, perhaps with certain acoustic signatures), a conversation/grouping point (where multiple people stand around, talk and wait; includes foot-to-foot in-place shuffling motion with acoustic signatures for talking), a drink dispensing machine such as an espresso machine (similar to copier but with different acoustic signature), a refrigerator (similar to door but without traversal through after opening), a person sitting down to eat (includes sitting at a time that corresponds to a meal time such as noon), a person sitting at park bench, a person sitting down to work (includes sitting and chair swiveling, long periods of stationary sitting, and keyboard tapping and mouse clicking sounds), a person walking up/down stairs between floors, a person entering/exiting/riding an elevator, and/or a person walking through a hallway.

In some embodiments, the first mapping is a directed graph (612) that includes a plurality nodes that correspond to locations in the physical space and one or more links that each connect a respective pair of two nodes from the plurality of nodes and indicate that it is possible, in the physical space, to move (directly) between the two nodes in the respective pair of nodes, such as the mappings described above with reference to FIGS. 5A-5J. In some embodiments, a respective link connecting two respective nodes includes (614) information about one or more differences between the two respective nodes, wherein the one or more differences include one or more of: a distance between the two respective nodes in the physical place; (e.g., measured in steps, in travel time at a predefined speed such as a typical walking speed, or in standard units of distance) a difference in altitude between the two respective nodes; a difference in temperature between the two respective nodes; a difference in humidity between the two respective nodes; a difference in use heading between the two respective nodes; a difference in atmospheric pressure between the two respective nodes; a difference in magnetic field between the two respective nodes; a difference in detected sound between the two respective nodes; and a difference in light detected between the two respective nodes (e.g., a difference in color, light temperature, etc.). In some embodiments, the respective link also includes information indicating a path shape between the two respective nodes.

In some embodiments, a respective link connecting two respective nodes includes (616) information about differences in a respective variable (e.g., distance, altitude, temperature, atmospheric pressure, magnetic field, detected sound, or detected light) between the two respective nodes and changes in the variable that occur as the link is traversed. In some embodiments, the link describes variable changes at multiple points between the two nodes. In some embodiments, the link describes a variable that changes continuously in accordance with a predefined function between the value of the variable at the one of the nodes and the value of the variable at the other node. In some embodiments, the information about a change in the variable along a path is represented by a plurality of nodes with different values for the variable and links connecting the nodes (e.g., a linear falloff for temperature or an inverse distance cubed falloff for a magnetic disturbance).

In some embodiments, while determining a respective context of the first user, the processing apparatus obtains information indicating that three or more people are present in the respective context (e.g., detecting multiple devices in the same context at the same time based on information from the sensors of the devices or detecting multiple people talking with the one or more devices coupled to the first user, such as User 1 and User 2 being concurrently present in the Group meeting space in Physical Space 502 in FIGS. 5A-5J). In some embodiments, generating (618) the first mapping includes identifying the respective context in the first mapping as a group meeting space when information indicating that three or more people are present in the respective context is obtained while determining a respective context of the first user.

In some embodiments, the processing apparatus detects (620) other movement of one or more users between contexts in the physical space (e.g., in an analogous manner to that discussed for the first user above) and generates, (622) based on the other movement of the one or more users between the contexts in the physical space, one or more additional mappings of the physical space, including a second mapping of the physical space (e.g., Mapping 516 based on activity of the second user in FIG. 5H), that include information corresponding to one or more respective spatial relationships between respective contexts in the physical space. In some embodiments, the second mapping is (624) based on movement of the first user between contexts in the physical space. In some embodiments, the second mapping is (626) based on movement of a second user, different from the first user, between contexts in the physical space. In some embodiments, the first mapping is (628) different from the second mapping and the method includes generating a combined mapping (e.g., Combined Mapping 520 in FIG. 5J) of the physical space that is based on the first mapping and the second mapping.

In some embodiments, the first mapping and the second mapping each include a plurality of nodes corresponding to different contexts and a plurality of links between the nodes, and generating the combined mapping includes combining (630) a link from the first mapping that connects the first node and the second node with a link from the second mapping that connects the first node and the second node (e.g., redundant links are removed from the combined mapping, as described above with reference to FIGS. 5E and 5F). In some embodiments, one or more links that are not redundant are retained, so that the combined mapping includes one or more links from the first mapping that were not included in the second mapping and/or one or more links from the second mapping that were not included in the first mapping (e.g., as described above with reference to FIGS. 5G-5J). In some embodiments, the first mapping and the second mapping each include a plurality of nodes corresponding to different contexts and a plurality of links between the nodes and generating the combined mapping includes combining (632) a node from the first mapping with a node from the second mapping so that links connecting to the node from the first mapping and links connecting to the node from the second mapping connect to a combined node in the combined mapping (e.g., redundant nodes are removed from the combined mapping, as described above with reference to FIGS. 5E and 5F). In some embodiments, one or more nodes that are not redundant are retained, so that the combined mapping includes one or more nodes from the first mapping that were not included in the second mapping and/or one or more nodes from the second mapping that were not included in the first mapping (e.g., as described above with reference to FIGS. 5G-5J). In some embodiments, the processing apparatus determines, based on node similarity criteria, whether two nodes represent the same context and when (i.e., in accordance with a determination that) the two nodes meet the node similarity criteria, the nodes are combined, and when (i.e., in accordance with a determination that) the nodes do not meet the node similarity criteria, the nodes are not combined.

In some embodiments, generating the combined mapping of the physical space includes identifying (634) a first node in the first mapping that corresponds to a fixed point in the physical space (e.g., a fixed entrance to a room such as a doorway or a primary entrance to a building or other mapped location) identifying a second node in the second mapping that corresponds to the fixed point in the physical space and aligning the first mapping with the second mapping using the first node and the second node as reference points. For example Door 1 in the mappings shown in FIGS. 5G and 5H is used to combine Mapping 514 with Mapping 516.

In some embodiments, after (636) generating the first mapping, the processing apparatus monitors (638) a plurality of subsequent traversals of the first mapping by one or more users and identifies (640) a set of three or more contexts that are repeatedly traversed in a respective order during the subsequent traversals of the first mapping (e.g., walking through one door, turning right and then walking through a second door). In some embodiments, after generating the first mapping and identifying the set of three or more contexts, the processing apparatus updates (642) the first mapping to identify the set of contexts as a subgroup of the first mapping. In some embodiments, after the subgroup is identified, the first mapping is modified based on the subgroup. For example, if the subgroup of nodes are always traversed in order (e.g., node A to node B to node C), in many circumstances there is no need to store information about the internal nodes (e.g., node B) separately (e.g., the Door 2 node between the Right Turn node and the Seats nodes in FIG. 5J could be removed if users typically go straight through the door to the seats). Thus, the complexity of the first mapping can be reduced by collapsing the three nodes and two links to two nodes and a single link (that contains the link information in the original subgroup). In some embodiments the subgroup is used for predicting later traversal of the map. For example, after identifying a subgroup that describes the path from a particular office to a meeting room and detecting a user start moving along this path (e.g., by identifying traversal of nodes and links that correspond to traversal of the subgroup), the processing apparatus can predict where the user is going before he/she gets there (e.g., a prediction that User 2 is headed to the meeting room in Physical Space 502). The prediction that the user is headed to a particular node can be used to change behavior on the device (e.g., sending a reminder to the user to set their phone to a silent mode or make sure they have paperwork that is needed for an appointment). This prediction can also help to improve location estimates under noisy observations (e.g. if there is a large magnetic anomaly along one of the links that is not normally there, the prediction based on the subgroup can be used to identify and account for the magnetic anomaly so that it does not adversely affect the location estimate). However, in some situations it is advantageous to maintain a sequence of links and nodes, each with information about a distinct portion of a respective path, so as to provide more detailed information when traversing the first mapping.

In some embodiments, after generating the first mapping, the processing apparatus stores (644) mapping information based at least in part on the first mapping for use in interpreting sensor measurements to determine movement of one or more users through the physical space (e.g., as described in greater detail below with reference to method 700). In some embodiments, the processing apparatus provides (646) the mapping information to one or more devices coupled to a second user different from the first user.

In some embodiments, the mapping information includes (648) information indicative of differences in one or more environmental parameters (e.g., altitude, temperature, magnetic disturbance, etc.) between the first context and the second context, and the processing apparatus detects (650) that the user has moved from the first context to the second context. In some embodiments, in response to detecting that the user has moved from the first context to the second context, the processing apparatus adjusts (652) operation of the device in accordance with the differences in the one or more environmental parameters.

In some embodiments, the processing apparatus detects (654) movement of a respective device through the physical space and compares (656) the movement of the respective device through the physical space to a plurality of mappings of the physical space that correspond to different users. In some embodiments, after detecting the movement of the respective device and comparing the movement, the processing apparatus identifies (658) a respective mapping of the physical space that is consistent with the movement of the device through the physical space. For example a mapping that matches Mapping 514 in FIG. 5G (or, optionally, a predefined subset thereof) is consistent with movement of User 1, while a mapping that matches Mapping 516 in FIG. 5H (or, optionally, a predefined subset thereof) is consistent with movement of User 2. In some embodiments, in response to identifying the respective mapping of the physical space as being consistent with the movement of the device through the physical space, the processing apparatus identifies (660) the user that corresponds to the respective mapping as the current user of the respective device. In some embodiments, after the user has been identified as the current user of the respective device, if the respective user is an authorized user of the device, the device is unlocked and the user is granted access to restricted information/capabilities of the respective device. In contrast, if the respective user is not an authorized, then the device is not unlocked (if it is locked), or is locked (if it is unlocked) and/or is optionally erased or reported as stolen (e.g., because an unauthorized user is using the device).

In some embodiments, after (662) storing the mapping information, the processing apparatus detects (664) movement of the first user based on sensor measurements from one or more sensors of the set of one or more devices coupled to the first user; and determines (668) a change in context of the first user based on the detected movement and the mapping information. In some embodiments, the processing apparatus adjusts (670) operation of a respective device of the one or more devices coupled to the first user based on the change in context of the first user (e.g., putting a smartphone in a "silent mode" when the first user is in a group meeting space and switching the smartphone back to "ring mode" when the first user enters a break room or private office).

It should be understood that the particular order in which the operations in FIGS. 6A-6D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 800) are also applicable in an analogous manner to method 600 described above with respect to FIGS. 6A-6D. For example, the sensor measurements, contexts, and mappings described above with reference to method 600 optionally have one or more of the characteristics of the sensor measurements, contexts, and mappings described herein with reference to other methods described herein (e.g., method 700 and 800). For brevity, these details are not repeated here.

Figure 7A:
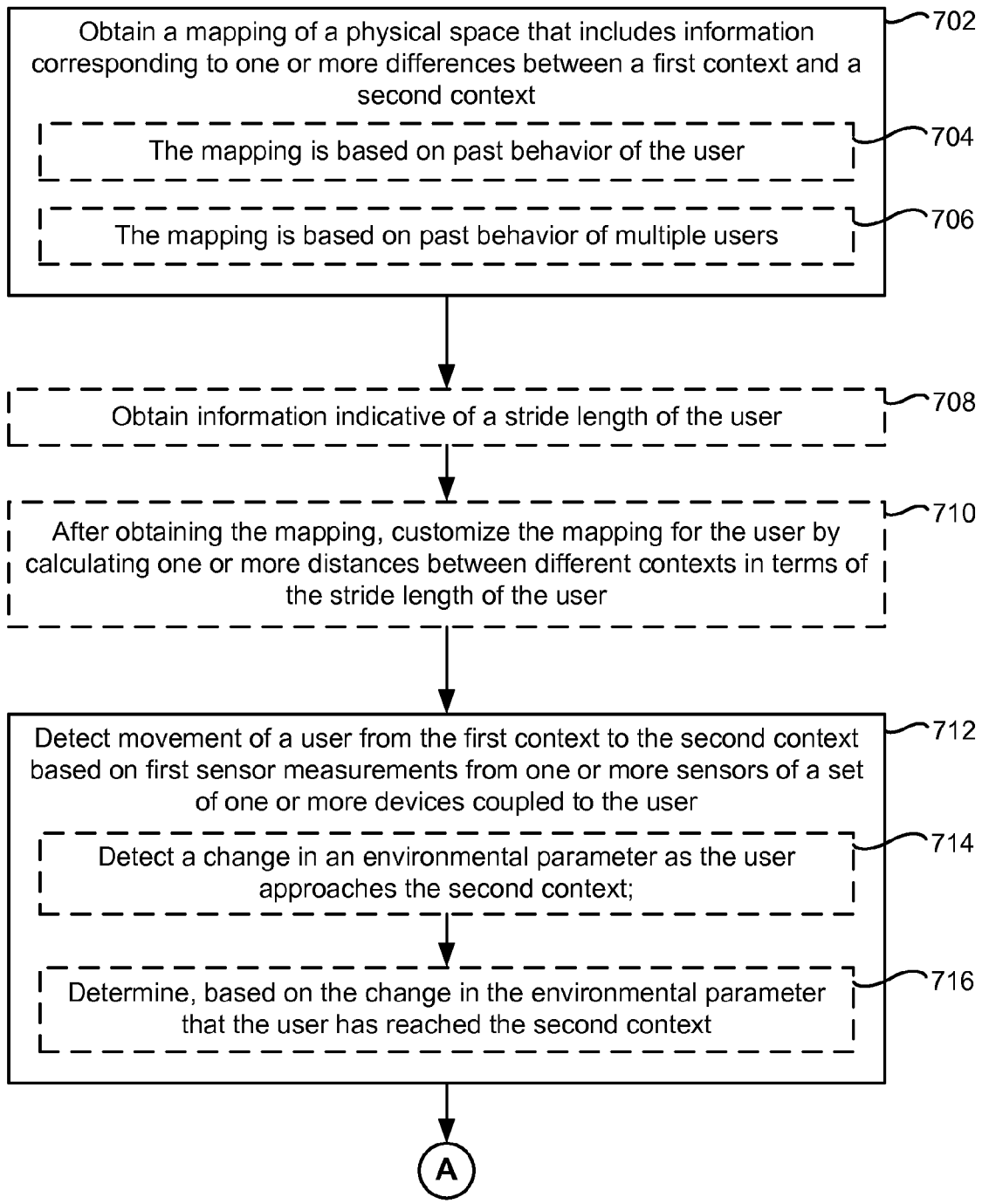
FIGS. 7A-7C are flow diagrams of a method for using changes in user context in a physical space to calibrate one or more sensors, according to some embodiments.
Figure 7B:
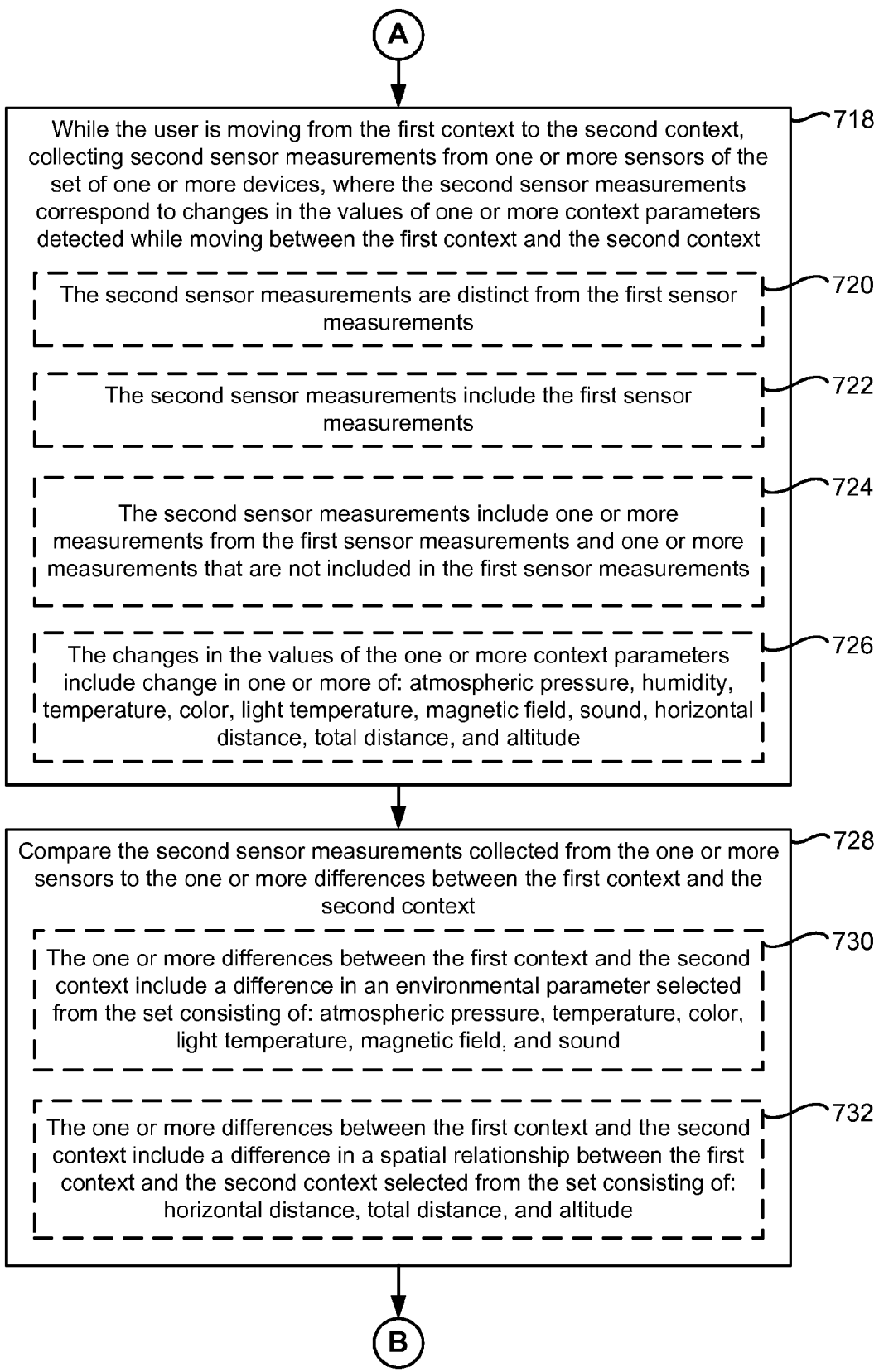
Figure 7C:
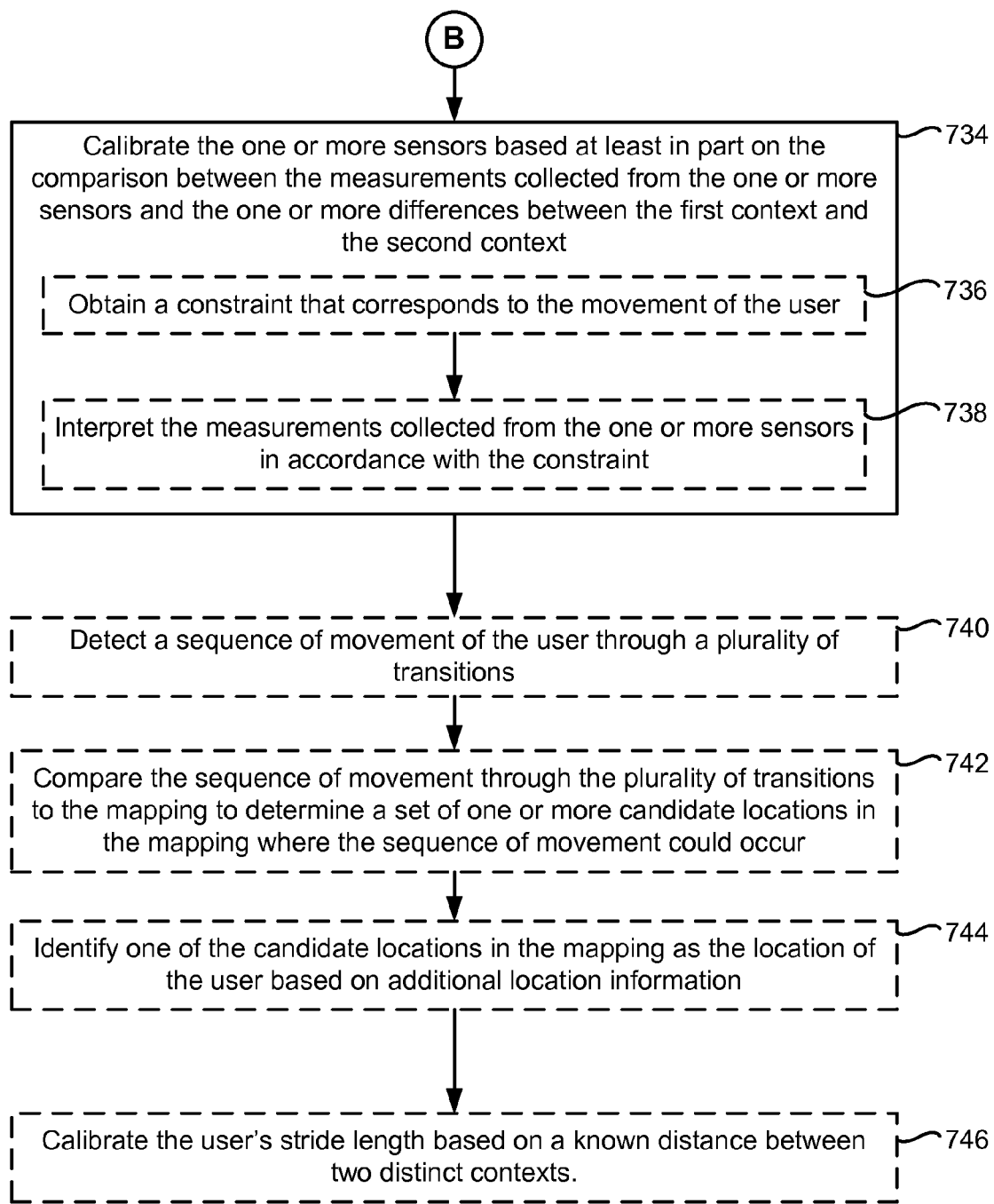

Attention is now directed to FIGS. 7A-7C, which illustrate a method 700 for using changes in user context in a physical space to calibrate one or more sensors, in accordance with some embodiments. Method 700 is, optionally, governed by instructions that are stored in a non-transitory computer readable storage medium and that are executed by one or more processors of one or more computer systems (e.g., Device 102, FIG. 9 or Host 101, FIG. 10). Each of the operations shown in FIGS. 7A-7C typically corresponds to instructions stored in a computer memory or non-transitory computer readable storage medium (e.g., Memory 1110 of Device 102 in FIG. 9 or Memory 1210 of Host 101 in FIG. 10). The computer readable storage medium optionally (and typically) includes a magnetic or optical disk storage device, solid state storage devices such as Flash memory, or other non-volatile memory device or devices. The computer readable instructions stored on the computer readable storage medium typically include one or more of: source code, assembly language code, object code, or other instruction format that is interpreted or executed by one or more processors. In various embodiments, some operations in method 700 are combined and/or the order of some operations is changed from the order shown in FIGS. 7A-7C.

The following operations are performed at a processing apparatus having one or more processors and memory storing one or more programs that, when executed by the one or more processors, cause the respective processing apparatus to perform the method. In some embodiments, the processing apparatus is a component of Device 102 (e.g., the processing apparatus includes the one or more CPU(s) 1102 in FIG. 9). In some embodiments, the processing apparatus is separate from Device 102 (e.g., the processing apparatus includes the one or more CPU(s) 1202 of a host system 101, an example of which is shown in FIG. 10).

The processing apparatus obtains (702) a mapping of a physical space that includes information corresponding to one or more differences between a first context and a second context. In some embodiments, the mapping is a Cartesian mapping (e.g., Mapping 512 in FIG. 5F). In some embodiments, the mapping is not a Cartesian mapping but is rather a mapping that provides information about a relationship between different locations/contexts in the mapping without providing information about the different locations relative to a common coordinate system (e.g., a non-Cartesian mapping such as Mapping 520 in FIG. 5J). In some embodiments, the mapping is (704) based on past behavior of the user (e.g., Mapping 514 in FIG. 5G). In some embodiments, the mapping is (706) based on past behavior of multiple users (e.g., Mapping 520 in FIG. 5J). In some embodiments, the mapping is based on measurements or plans for building the physical space, such as an official map or architectural blueprint for a building. Such mappings can be provided by owners/occupants of a building to improve navigation for visitors (e.g., a mall could provide a mapping for use in navigating the mall to customers visiting the mall to enable the visitors to more accurately locate stores within the mall). In another example, the mapping is derived from another physical mapping based, in turn, on vision sensors or other sensors.

In some embodiments, the processing apparatus obtains (708) information indicative of a stride length of the user; and after obtaining the mapping, customizes (710) the mapping for the user by calculating one or more distances between different contexts in terms of the stride length of the user. For example, if the mapping (e.g., Mapping 520 in FIG. 5J) identifies the distance between the first context as 15 feet and the stride length of the user is 3 feet, the mapping is, optionally, customized to indicate that the first context is 5 steps away from the second context.

The processing apparatus detects (712) movement of a user from the first context to the second context based on first sensor measurements from one or more sensors of a set of one or more devices coupled to the user. For example, the processing apparatus uses pedestrian dead reckoning based on measurements from one or more accelerometers to determine that the user has walked from a first room to a second room in a building. In some embodiments, detecting movement of the user from the first context to the second context includes detecting (714) a change in an environmental parameter as the user approaches the second context and determining, (716) based on the change in the environmental parameter that the user has reached the second context. For example, as a user approaches an object (e.g., a large metal object) that creates a magnetic anomaly in a local magnetic field, the processing apparatus detects the magnetic anomaly growing stronger as the user approaches the object and weaker as the user gets further from the object. For example, if the object is in a particular context, then the processing apparatus can determine that the user is in the particular context if the processing apparatus detects the magnetic anomaly with more than a threshold strength and/or detects the strength of the anomaly increase and then start decreasing again while the user is moving in the same direction (e.g., because the user passed through the context where the object causing the magnetic anomaly is located).

While the user is moving from the first context to the second context, second sensor measurements are collected (718) from one or more sensors of the set of one or more devices (e.g., by the processing apparatus), where the second sensor measurements correspond to changes in the values of one or more context parameters detected while moving between the first context and the second context. In some embodiments, the second sensor measurements are (720) distinct from the first sensor measurements (e.g., different sensor measurements are used to detect movement of the device and detect changes in values of the one or more context parameters). For example, one or more accelerometers are used to detect movement of a device between two contexts, while a thermal sensor is used to detect a change in temperature between the two contexts. In some embodiments, the second sensor measurements include (722) the first sensor measurements. For example, one or more accelerometers are used to detect movement of a device between two contexts, and a known distance between the two contexts is used to calibrate the one or more accelerometers. In some embodiments, the second sensor measurements include (724) one or more measurements from the first sensor measurements and one or more measurements that are not included in the first sensor measurements. For example, one or more accelerometers are used to detect movement of a device between two contexts, and a known distance between the two contexts is used to calibrate the one or more accelerometers and a thermal sensor. In some embodiments, the changes in the values of the one or more context parameters include (726) change in one or more of: atmospheric pressure, humidity, temperature, color, light temperature, magnetic field, sound, horizontal distance, user heading, total distance, and altitude.

The processing apparatus compares (728) the second sensor measurements collected from the one or more sensors to the one or more differences between the first context and the second context. In some embodiments, the one or more differences between the first context and the second context include (730) a difference in an environmental parameter selected from the set consisting of: atmospheric pressure, humidity, temperature, color, light temperature, magnetic field, and sound. In some embodiments, the one or more differences between the first context and the second context include (732) a difference in a spatial relationship between the first context and the second context selected from the set consisting of: horizontal distance, user heading, total distance, and altitude.

After comparing the second sensor measurements with the differences, the processing apparatus calibrates (734) the one or more sensors based at least in part on the comparison between the measurements collected from the one or more sensors and the one or more differences between the first context and the second context. For example, the processing apparatus uses the first set of sensors to detect movement from a first room to a second room with a known temperature difference (e.g., a temperature difference between a kitchen and a walk in refrigerator) and uses a thermal sensor to detect a temperature in the first room and detect a second temperature in the second room. After measuring the temperature difference between the first room and the second room, the processing apparatus compares the measured temperature difference and the known temperature difference and calibrates the thermal sensor so that the measured temperature difference (after calibration) matches the known temperature difference. In some embodiments, calibrating the one or more sensors includes obtaining (736) a constraint that corresponds to the movement of the user and interpreting (738) the measurements collected from the one or more sensors in accordance with the constraint. For example, a number of detected steps up a staircase is combined with a building-code required step height to determine a more accurate estimate of altitude change due to climbing the staircase. As another example, a trip up an elevator/escalator/staircase from one floor to another floor is used to determine the floor on which the user is located, and a known elevation of the different floors of the building is used to determine an altitude of the user. As another example, a trip up an elevator/escalator/staircase from one floor to another floor is used to determine approximately many floors the user has moved and a known elevation difference between the floors (e.g., a floor spacing or floor height) is used to determine an altitude of the user, which will have changed by an integer multiple of the elevation difference between the floors of the building if the user moved between two floors of the building). As another example, counting a number of steps while a user is walking down a corridor of known length can also be used to calibrate stride length of the user.

In some embodiments, the processing apparatus detects (740) a sequence of movement of the user through a plurality of transitions. In some embodiments, the plurality of transitions include one or more of: transitions between different contexts, transition events (e.g., door open, door close, sit, stand), transitions between movement modalities: (e.g., walk, turn, run), transition between elevation (e.g., stairs, ramp, elevator, escalator). In some embodiments, after detecting the sequence of movement, the processing apparatus compares (742) the sequence of movement through the plurality of transitions to the mapping to determine a set of one or more candidate locations in the mapping where the sequence of movement could occur. In some embodiments, a particle filter algorithm is used to identify the candidate locations. In some embodiments, the processing apparatus identifies (744) one of the candidate locations in the mapping as the location of the user based on additional location information (e.g., GPS, WiFi triangulation, dead reckoning, pedestrian dead reckoning, etc.). In some embodiments, the processing apparatus calibrates (746) the user's stride length based on a known distance between two distinct contexts.

It should be understood that the particular order in which the operations in FIGS. 7A-7C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600 and 800) are also applicable in an analogous manner to method 700 described above with respect to FIGS. 7A-7C. For example, the sensor measurements, contexts, and mappings described above with reference to method 700 optionally have one or more of the characteristics of the sensor measurements, contexts, and mappings described herein with reference to other methods described herein (e.g., method 600 and 800). For brevity, these details are not repeated here.

Figure 8A:
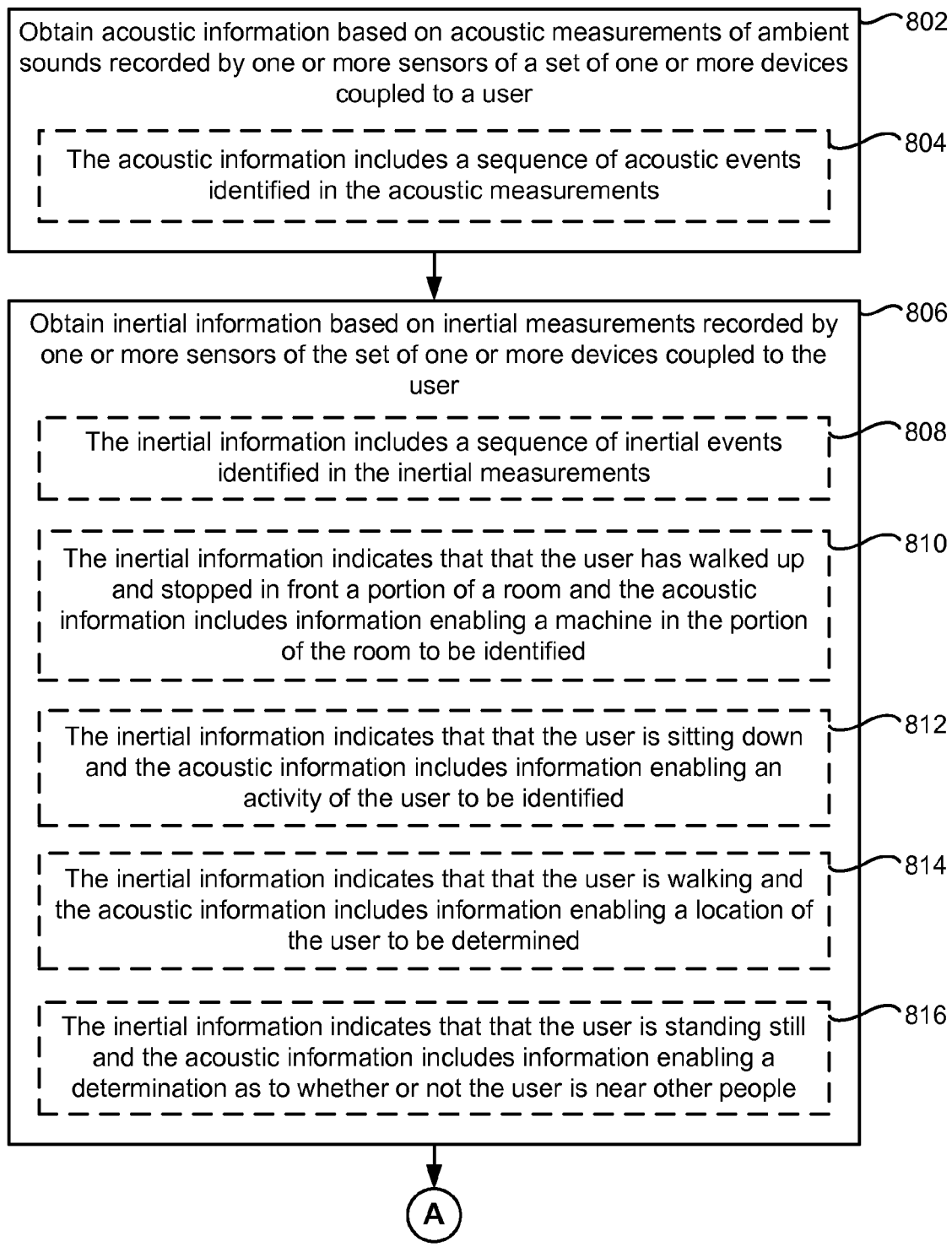
FIGS. 8A-8C are flow diagrams of a method for correlating acoustic context with inertial context, according to some embodiments.
Figure 8B:
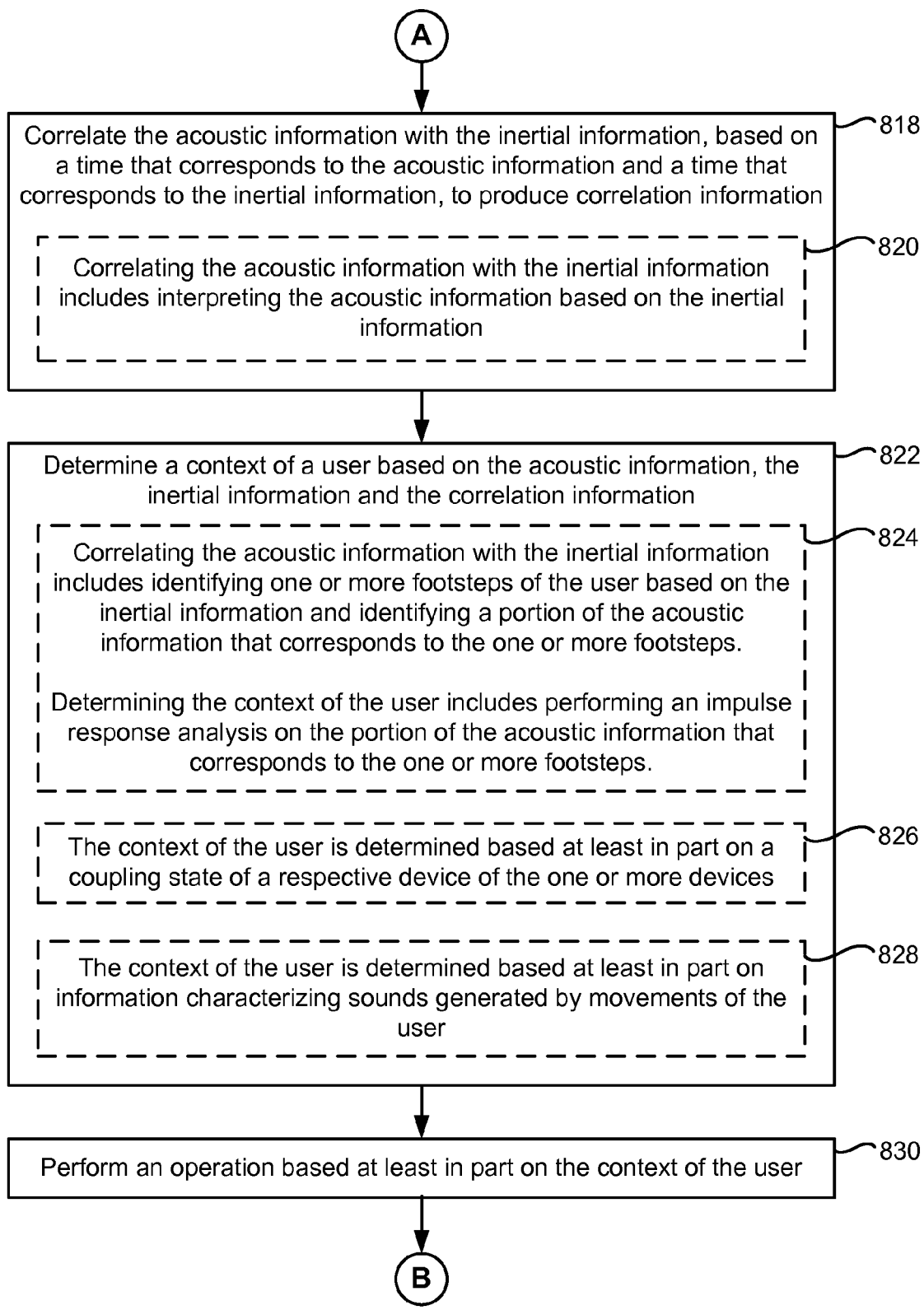
Figure 8C:
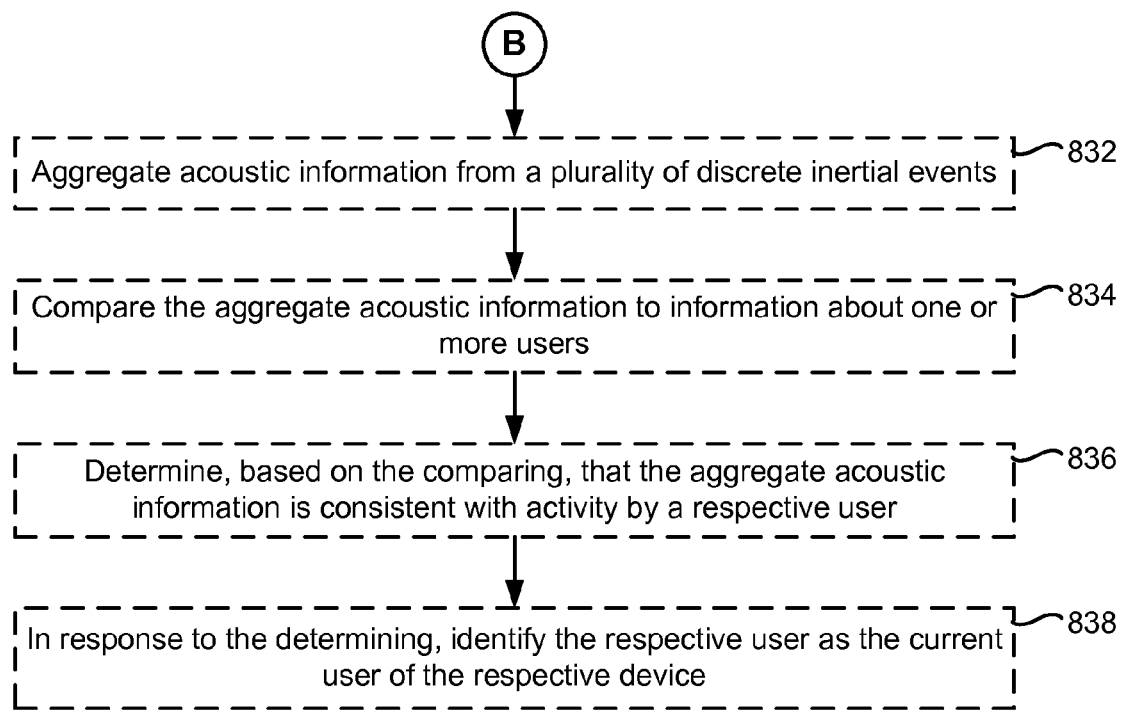

Attention is now directed to FIGS. 8A-8C, which illustrate a method 800 for acoustic context with inertial context, in accordance with some embodiments. Method 800 is, optionally, governed by instructions that are stored in a non-transitory computer readable storage medium and that are executed by one or more processors of one or more computer systems (e.g., Device 102, FIG. 9 or Host 101, FIG. 10). Each of the operations shown in FIGS. 8A-8C typically corresponds to instructions stored in a computer memory or non-transitory computer readable storage medium (e.g., Memory 1110 of Device 102 in FIG. 9 or Memory 1210 of Host 101 in FIG. 10). The computer readable storage medium optionally (and typically) includes a magnetic or optical disk storage device, solid state storage devices such as Flash memory, or other non-volatile memory device or devices. The computer readable instructions stored on the computer readable storage medium typically include one or more of: source code, assembly language code, object code, or other instruction format that is interpreted or executed by one or more processors. In various embodiments, some operations in method 800 are combined and/or the order of some operations is changed from the order shown in FIGS. 8A-8C.

The following operations are performed at a processing apparatus having one or more processors and memory storing one or more programs that, when executed by the one or more processors, cause the respective processing apparatus to perform the method. In some embodiments, the processing apparatus is a component of Device 102 (e.g., the processing apparatus includes the one or more CPU(s) 1102 in FIG. 9). In some embodiments, the processing apparatus is separate from Device 102 (e.g., the processing apparatus includes the one or more CPU(s) 1202 of a host system 101, an example of which is shown in FIG. 10).

The processing apparatus obtains (802) acoustic information based on acoustic measurements of ambient sounds (e.g., not a predefined sound that was initiated by the device) recorded by one or more sensors (e.g., microphones, accelerometers, pressure sensors, or any other sensor capable of detecting sounds) of a set of one or more devices coupled to a user (e.g., detecting a noise generated by a footfall). For example the processing apparatus records sounds detected while a user is traversing Physical Space 502 in FIGS. 5A-5J. In some embodiments, the acoustic information includes (804) a sequence of acoustic events identified in the acoustic measurements (e.g., the acoustic measurements are processed to identity acoustic events and/or acoustic parameter values characterizing changes in the acoustic environment of the set of one or more devices).

The processing apparatus obtains (806) inertial information based on inertial measurements recorded by one or more sensors of the set of one or more devices coupled to the user (e.g., detecting a time of the footfall that generated the noise based on sensing an inertial "jolt" corresponding to the footfall by, for example, detecting a sudden change in acceleration of the one or more devices). In some embodiments, the inertial information includes (808) a sequence of inertial events identified in the inertial measurements (e.g., the inertial measurements are processed to identity inertial events and/or inertial parameter values characterizing changes in the inertial environment of the set of one or more devices).

In some embodiments or in some circumstances, the inertial information indicates (810) that that the user has walked up and stopped in front a portion of a room and the acoustic information includes information enabling a machine in the portion of the room to be identified (e.g., the acoustic information is used to differentiate the copy machine in Physical Space 502 from the coffee machine in Physical Space 502 in FIGS. 5A-5J). In some embodiments, the inertial information indicates (812) that that the user is sitting down and the acoustic information includes information enabling an activity of the user to be identified (e.g., the acoustic information is used to determine whether the user is eating lunch or working at a computer by identifying sounds near the user as corresponding to crumpling wrappers). In some embodiments, the inertial information indicates (814) that that the user is walking and the acoustic information includes information enabling a location of the user to be determined (e.g., the acoustic information is used to determine whether the user is walking in a hallway or a large room). In some embodiments, the inertial information indicates (816) that that the user is standing still and the acoustic information includes information enabling a determination as to whether or not the user is near other people (e.g., the acoustic information is used to determine whether other people are talking nearby such as at the Group meeting location in Physical Space 502 in FIGS. 5A-5J).

After obtaining the acoustic information and the inertial information, the processing apparatus correlates (818) the acoustic information with the inertial information, based on a time that corresponds to the acoustic information and a time that corresponds to the inertial information, to produce correlation information. In some embodiments, correlating the acoustic information with the inertial information includes (820) interpreting the acoustic information based on the inertial information (e.g., identifying a portion of acoustic information that occurs shortly after an inertial impulse as having been caused by a user action that corresponds to the inertial impulse).

The processing apparatus determines (822) a context of a user based on the acoustic information, the inertial information and the correlation information. In some embodiments, correlating the acoustic information with the inertial information includes identifying (824) one or more footsteps of the user based on the inertial information and identifying a portion of the acoustic information that corresponds to the one or more footsteps, and determining the context of the user includes performing an impulse response analysis on the portion of the acoustic information that corresponds to the one or more footsteps. For example, the impulse response analysis is performed using information about the acoustic characteristics of the acoustic impulse generated by footsteps of the user (e.g., a previously recorded footstep by the user in a known location optionally adjusted to account for the footwear of the user and/or the characteristics of the floor on which the user is walking).

In some embodiments, the context of the user is determined (826) based at least in part on a coupling state of a respective device of the one or more devices. In some embodiments, the processing apparatus determines whether the phone is in the user's hand or pocket and interprets the acoustic information in accordance with that information (e.g., sounds created by the user's footsteps will generate different acoustic signals at the respective device if the respective device is in the user's hand than if the respective device is in the user's pocket). In some embodiments, the context of the user is determined (828) based at least in part on information characterizing sounds generated by movements of the user. For example, at a beginning of a day, the processing apparatus analyzes sounds generated by movements of the user to determine whether the user is carrying keys or is wearing shoes with hard soles or soft soles and uses this information to interpret sounds that correspond to footfalls of the user during the rest of the day. A more accurate characterization of the sounds generated by movements of the user (e.g., a frequency distribution of sounds generated by a footfall) enables the processing apparatus to more accurately determine a context of the user by performing a more accurate impulse response analysis for a physical space in which the user is located using the sounds generated by a footfall as the initial impulse.

After determining the context of the user, the processing apparatus performs (830) an operation based at least in part on the context of the user. For example, the processing apparatus calibrates a sensor of the one or more devices based on a known change in temperature or altitude or initiates a "silent mode" for the device when a user is in a meeting and enables the device to provide audible alerts such as ringtones when the user is in a private space such as an office or car.

In some embodiments, the processing apparatus aggregates (832) acoustic information from a plurality of discrete inertial events and compares (834) the aggregate acoustic information to information about one or more users. In some embodiments after comparing the aggregate acoustic information to the information about one or more users, the processing apparatus determines, (836) based on the comparing, that the aggregate acoustic information is consistent with activity by a respective user. In some embodiments, in response to the determining, identifying (838) the respective user as the current user of the respective device. In some embodiments, a shoe type, weight, shoe size or other characteristic of the user is used to determine whether acoustic information corresponding to footfall events is compatible with footfalls of the user. For example, if the acoustic information for a plurality of footfalls has an acoustic signature that does not match an expected acoustic signature from any shoes that are known to be owned by the user, then the respective user would not be identified as the current user of the respective device. In some embodiments, after the respective user has been identified as the current user of the respective device, if the respective user is an authorized user of the device, the device is unlocked and the respective user is granted access to restricted information/capabilities of the respective device. In contrast, if the respective user is not an authorized, then the device is not unlocked (if it is locked), or is locked (if it is unlocked) and/or is optionally erased or reported as stolen (e.g., because an unauthorized user is using the device).

It should be understood that the particular order in which the operations in FIGS. 8A-8C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600 and 700) are also applicable in an analogous manner to method 800 described above with respect to FIGS. 8A-8C. For example, the sensor measurements and contexts described above with reference to method 800 optionally have one or more of the characteristics of the sensor measurements and contexts described herein with reference to other methods described herein (e.g., method 600 and 700). For brevity, these details are not repeated here.

System Structure

Figure 9:
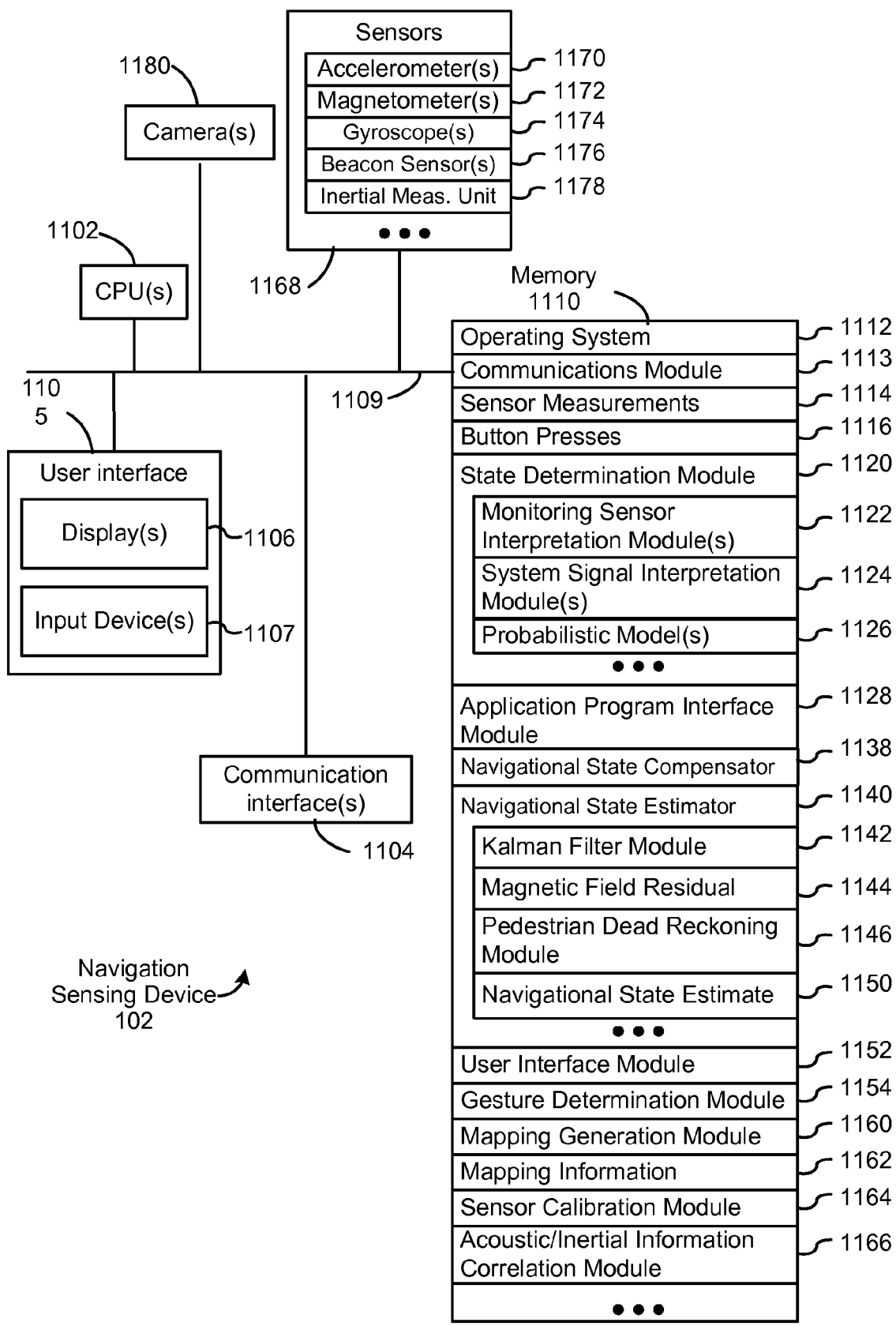
FIG. 9 presents a block diagram of an example navigation sensing device, according to some embodiments.
Figure 10:
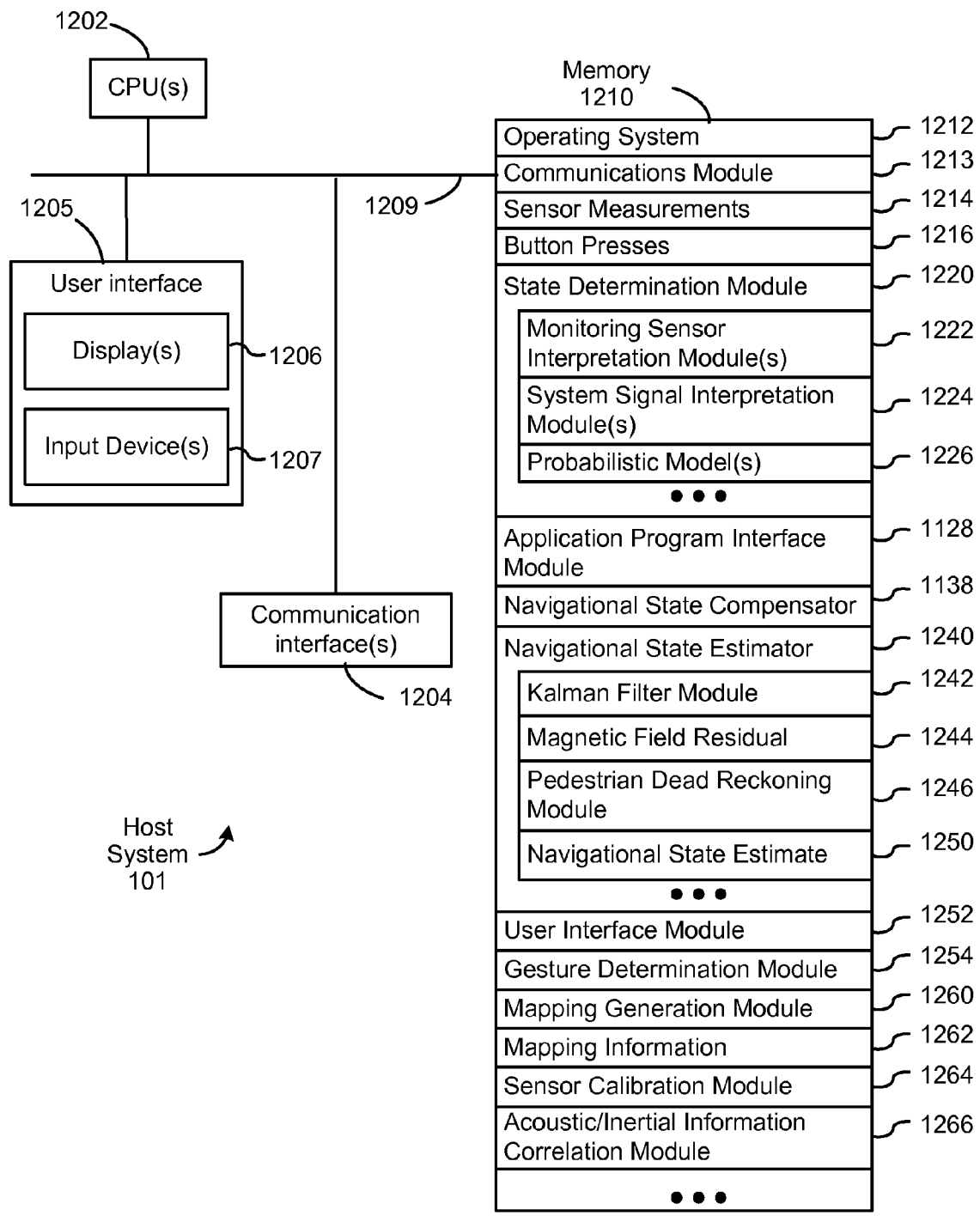
FIG. 10 presents a block diagram of an example host computer system, according to some embodiments.

FIG. 9 is a block diagram of Navigation sensing Device 102 (herein "Device 102"). Device 102 typically includes one or more processing units (CPUs) 1102, one or more network or other Communications Interfaces 1104 (e.g., a wireless communication interface, as described above with reference to FIG. 1), Memory 1110, Sensors 1168 (e.g., Sensors 220 such as one or more Accelerometers 1170, Magnetometers 1172, Gyroscopes 1174, Beacon Sensors 1176, Inertial Measurement Units 1178, Thermometers, Barometers, and/or Proximity Sensors, etc.), one or more Cameras 1180, and one or more Communication Buses 1109 for interconnecting these components. In some embodiments, Communications Interfaces 1104 include a transmitter for transmitting information, such as accelerometer and magnetometer measurements, and/or the computed navigational state of Device 102, and/or other information to Host 101. Communication buses 1109 typically include circuitry (sometimes called a chipset) that interconnects and controls communications between system components. Device 102 optionally includes user interface 1105 comprising Display 1106 (e.g., Display 104 in FIG. 1) and Input Devices 1107 (e.g., keypads, buttons, etc.). Memory 1110 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1110 optionally includes one or more storage devices remotely located from the CPU(s) 1102. Memory 1110, or alternately the non-volatile memory device(s) within Memory 1110, comprises a non-transitory computer readable storage medium. In some embodiments, Memory 1110 stores the following programs, modules and data structures, or a subset thereof:

- Operating System 1112 that includes procedures for handling various basic system services and for performing hardware dependent tasks;
- Communication Module 1113 that is used for connecting Device 102 to Host 101 and/or Device 106 via Communication Network Interface(s) 1104 (wired or wireless); Communication Module 1113 is optionally adapted for connecting Device 102 to one or more communication networks, such as the Internet, other wide area networks, local area networks, metropolitan area networks, and so on;
- Sensor Measurements 1114 (e.g., data representing accelerometer measurements, magnetometer measurements, gyroscope measurements, global positioning system measurements, beacon sensor measurements, inertial measurement unit measurements, thermometer measurements, atmospheric pressure measurements, proximity measurements, etc.);
- data representing Button Presses 1116;
- State Determination Module 1120 for determining context information for Device 102 (e.g., a state of Device 102 such as a navigational state and/or a state of an environment in which Device 102 is currently located), optionally including:
  - one or more Monitoring Sensor Interpretation Modules 1122 (e.g., Feature Extraction Module 412-1 in FIG. 4) for converting sensor measurements from the monitoring sensors into information that is compatible with Probabilistic Model 1126;
  - one or more System Signal Interpretation Modules 1124 (e.g., Feature Extraction Modules 412-2 and 412-3 in FIG. 4) for converting sensor measurements from the system signals into information that is compatible with Probabilistic Model 1126; and
  - Probabilistic Model 1126 (e.g., Probabilistic Model 414) for updating probabilities of contexts (e.g., device states, device environment states, and/or device user states) associated with Device 102 in accordance with model state probabilities, model transition probabilities and input information from Monitoring Sensor Interpretation Modules 1122 and System Signal Interpretation Modules 1124;
- Application Program Interface Module 1128 (e.g., Application Program Interface 424 in FIG. 4), for providing access to context information (e.g., device context information and/or user context information) via a set of consistent and documented protocols so as to enable a number of different applications to efficiently and effectively access context information and adjust operation of the device or other devices in accordance with that information, optionally including one or more Virtual Context Sensors (e.g., Virtual Context Sensors 418 in FIG. 4), one or more Derived Position Sensors (e.g., Derived Position Sensors 420 in FIG. 4), and Historical Device Information 1234 (e.g., Historical Device Information 422 in FIG. 4);
- Navigational State Compensator 1138 for determining a fixed compensation (e.g., a rotational offset) for compensating for drift in the navigational state estimate;
- Navigation State Estimator 1140 for estimating navigational states of Device 102, optionally including:
  - Kalman Filter Module 1142 that determines the attitude of Device 102, as described in U.S. Pat. Pub. No. 2010/0174506 Equations 8-29, wherein the Kalman filter module includes: a sensor model (e.g., the sensor model described in Equations 28-29 of U.S. Pat. Pub. No. 2010/0174506), a dynamics model (e.g., the dynamics model described in Equations 15-21 of U.S. Pat. Pub. No. 2010/0174506), a predict module that performs the predict phase operations of the Kalman filter, an update module that performs the update operations of the Kalman filter, a state vector of the Kalman filter (e.g., the state vector in Equation 10 of U.S. Pat. Pub. No. 2010/0174506), a mapping, Kalman filter matrices, and attitude estimates (e.g., the attitude estimates as obtained from the quatemion in the state vector $\hat{x}$ in Equation 10 of U.S. Pat. Pub. No. 2010/0174506);
  - Magnetic Field Residual 1144 that is indicative of a difference between a magnetic field detected based on measurements from Magnetometer(s) 1172 and a magnetic field estimated based on Kalman Filter Module 1142;
  - Pedestrian Dead Reckoning Module 1146, for determining a direction of motion of the entity and updating a position of the device in accordance with the direction of motion of the entity, stride length, and stride count (additional details regarding pedestrian dead reckoning can be found in A. Jimenez, F. Seco, C. Prieto, and J. Guevara, "A comparison of Pedestrian Dead-Reckoning algorithms using a low-cost MEMS IMU," IEEE International Symposium on Intelligent Signal Processing 26-28 Aug. 2009, p. 37-42, which is incorporated herein by reference in its entirety); and data representing Navigational State Estimate 1150 (e.g., an estimate of the position and/or attitude of Device 102).

optionally, User Interface Module 1152 that receives commands from the user via Input Device(s) 1107 and generates user interface objects in Display(s) 1106 in accordance with the commands and the navigational state of Device 102, User Interface Module 1152 optionally includes one or more of: a cursor position module for determining a cursor position for a cursor to be displayed in a user interface in accordance with changes in a navigational state of the navigation sensing device, an augmented reality module for determining positions of one or more user interface objects to be displayed overlaying a dynamic background such as a camera output in accordance with changes in a navigational state of the navigation sensing device, a virtual world module for determining a portion of a larger user interface (a portion of a virtual world) to be displayed in accordance with changes in a navigational state of the navigation sensing device, a pedestrian dead reckoning module for tracking movement of Device 102 over time, and other application specific user interface modules; and optionally, Gesture Determination Module 1154 for determining gestures in accordance with detected changes in the navigational state of Device 102;

optionally, Mapping Generation Module 1160 for generating a mapping of a physical space based on sensor measurements obtained from sensors of one or more devices associated with a user while a user is traversing the physical space (e.g., as described in greater detail above with reference to method 600 and FIGS. 5A-5J);

optionally, Mapping Information 1162 corresponding to mappings for one or more physical spaces such as the mapping generated by Mapping Generation Module 1160 or mappings generated by other devices and provided to the Navigation Sensing Device 102 for use while the user and the device are in the physical space (e.g., after being obtained by a processing apparatus as described in greater detail above with reference to method 700);

optionally, Sensor Calibration Module 1164 for calibrating sensors based on sensor measurements from two or more different contexts and known differences between the two or more different contexts (e.g., as described in greater detail above with reference to method 700); and optionally, Acoustic/Inertial Information Correlation Module 1166 for demining a context of a user based on a correlation between acoustic information and inertial information obtained from one or more sensors that are associated with a user (e.g., as described in greater detail above with reference to method 800).

It is noted that in some of the embodiments described above, Device 102 does not include a Gesture Determination Module 1154, because gesture determination is performed by Host 101. In some embodiments described above, Device 102 also does not include State Determination Module 1120, Navigational State Estimator 1140 and User Interface Module because Device 102 transmits Sensor Measurements 1114 and, optionally, data representing Button Presses 1116 to a Host 101 at which a navigational state of Device 102 is determined.

Each of the above identified elements may be stored in one or more of the previously mentioned memory devices, and each of the above identified programs or modules corresponds to a set of instructions for performing a function described above. The set of instructions can be executed by one or more processors (e.g., CPUs 1102). The above identified modules or programs (i.e., sets of instructions) need not be implemented as separate software programs, procedures or modules, and thus various subsets of these modules may be combined or otherwise re-arranged in various embodiments. In some embodiments, Memory 1110 may store a subset of the modules and data structures identified above. Furthermore, Memory 1110 may store additional modules and data structures not described above.

Although FIG. 9 shows a "Navigation sensing Device 102," FIG. 9 is intended more as functional description of the various features which may be present in a navigation sensing device. In practice, and as recognized by those of ordinary skill in the art, items shown separately could be combined and some items could be separated.

FIG. 10 is a block diagram of Host Computer System 101 (herein "Host 101"). Host 101 typically includes one or more processing units (CPUs) 1202, one or more network or other Communications Interfaces 1204 (e.g., any of the wireless interfaces described above with reference to FIG. 1), Memory 1210, and one or more Communication Buses 1209 for interconnecting these components. In some embodiments, Communication Interfaces 1204 include a receiver for receiving information, such as accelerometer and magnetometer measurements, and/or the computed attitude of a navigation sensing device (e.g., Device 102), and/or other information from Device 102. Communication Buses 1209 optionally include circuitry (sometimes called a chipset) that interconnects and controls communications between system components. Host 101 optionally includes a User Interface 1205 comprising a Display 1206 (e.g., Display 104 in FIG. 1) and Input Devices 1207 (e.g., a navigation sensing device such as a multi-dimensional pointer, a mouse, a keyboard, a trackpad, a trackball, a keypad, buttons, etc.). Memory 1210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1210 optionally includes one or more storage devices remotely located from the CPU(s) 1202. Memory 1210, or alternately the non-volatile memory device(s) within Memory 1210, comprises a non-transitory computer readable storage medium. In some embodiments, Memory 1210 stores the following programs, modules and data structures, or a subset thereof:

Operating System 1212 that includes procedures for handling various basic system services and for performing hardware dependent tasks;

Communication Module 1213 that is used for connecting Host 101 to Device 102 and/or Device 106, and/or other devices or systems via Communication Network Interface(s) 1204 (wired or wireless), and for connecting Host 101 to one or more communication networks, such as the Internet, other wide area networks, local area networks, metropolitan area networks, and so on;

Sensor Measurements 1214 (e.g., data representing accelerometer measurements, magnetometer measurements, gyroscope measurements, global positioning system measurements, beacon sensor measurements, inertial measurement unit measurements, thermometer measurements, atmospheric pressure measurements, proximity measurements, etc.);

data representing Button Presses 1216;

State Determination Module 1220 for determining context information for Device 102 (e.g., a state of Device 102 such as a navigational state and/or a state of an environment in which Device 102 is currently located), optionally including:

one or more Monitoring Sensor Interpretation Modules 1222 (e.g., Feature Extraction Module 412-1 in FIG. 4) for converting sensor measurements from the monitoring sensors into information that is compatible with Probabilistic Model 1226;

one or more System Signal Interpretation Modules 1224 (e.g., Feature Extraction Modules 412-2 and 412-3 in FIG. 4) for converting sensor measurements from the system signals into information that is compatible with Probabilistic Model 1226; and Probabilistic Model 1226 (e.g., Probabilistic Model 414) for updating probabilities of contexts (e.g., device states, device environment states, and/or device user states) associated with Device 102 in accordance with model state probabilities, model transition probabilities and input information from Monitoring Sensor Interpretation Modules 1222 and System Signal Interpretation Modules 1224;

Application Program Interface Module 1228 (e.g., Application Program Interface 424 in FIG. 4), for providing access to context information (e.g., device context information and/or user context information) via a set of consistent and documented protocols so as to enable a number of different applications to efficiently and effectively access context information and adjust operation of the device or other devices in accordance with that information, optionally including one or more Virtual Context Sensors (e.g., Virtual Context Sensors 418 in FIG. 4), one or more Derived Position Sensors (e.g., Derived Position Sensors 420 in FIG. 4), and Historical Device Information 1234 (e.g., Historical Device Information 422 in FIG. 4);

Navigational State Compensator 1238 for determining a fixed compensation (e.g., a rotational offset) for compensating for drift in the navigational state estimate of Device 102;

Navigation State Estimator 1240 for estimating navigational states of Device 102, optionally including:

Kalman Filter Module 1242 that determines the attitude of Device 102, as described in U.S. Pat. Pub. No. 2010/0174506 Equations 8-29, wherein the Kalman filter module includes: a sensor model (e.g., the sensor model described in Equations 28-29 of U.S. Pat. Pub. No. 2010/0174506), a dynamics model (e.g., the dynamics model described in Equations 15-21 of U.S. Pat. Pub. No. 2010/0174506), a predict module that performs the predict phase operations of the Kalman filter, an update module that performs the update operations of the Kalman filter, a state vector of the Kalman filter (e.g., the state vector in Equation 10 of U.S. Pat. Pub. No. 2010/0174506), a mapping, Kalman filter matrices, and attitude estimates (e.g., the attitude estimates as obtained from the quatemion in the state vector $\hat{x}$ in Equation 10 of U.S. Pat. Pub. No. 2010/0174506);

Magnetic Field Residual 1244 that is indicative of a difference between a magnetic field detected based on measurements from Magnetometer(s) 1272 and a magnetic field estimated based on Kalman Filter Module 1242;

Pedestrian Dead Reckoning Module 1246, for determining a direction of motion of the entity and updating a position of the device in accordance with the direction of motion of the entity, stride length and stride count; and data representing Navigational State Estimate 1250 (e.g., an estimate of the position and/or attitude of Device 102).

optionally, User Interface Module 1252 that receives commands from the user via Input Device(s) 1207 and generates user interface objects in Display(s) 1206 in accordance with the commands and the navigational state of Device 102, User Interface Module 1252 optionally includes one or more of: a cursor position module for determining a cursor position for a cursor to be displayed in a user interface in accordance with changes in a navigational state of the navigation sensing device, an augmented reality module for determining positions of one or more user interface objects to be displayed overlaying a dynamic background such as a camera output in accordance with changes in a navigational state of the navigation sensing device, a virtual world module for determining a portion of a larger user interface (a portion of a virtual world) to be displayed in accordance with changes in a navigational state of the navigation sensing device, a pedestrian dead reckoning module for tracking movement of Device 102 over time, and other application specific user interface modules;

optionally, Gesture Determination Module 1254 for determining gestures in accordance with detected changes in the navigational state of Device 102;

optionally, Mapping Generation Module 1260 for generating a mapping of a physical space based on sensor measurements obtained from sensors of one or more devices associated with a user while a user is traversing the physical space (e.g., as described in greater detail above with reference to method 600 and FIGS. 5A-5J);

optionally, Mapping Information 1262 corresponding to mappings for one or more physical spaces such as the mapping generated by Mapping Generation Module 1260 or mappings generated by other devices and provided to the Navigation Sensing Device 102 for use while the user and the device are in the physical space (e.g., after being obtained by a processing apparatus as described in greater detail above with reference to method 700);

optionally, Sensor Calibration Module 1264 for calibrating sensors based on sensor measurements from two or more different contexts and known differences between the two or more different contexts (e.g., as described in greater detail above with reference to method 700); and optionally, Acoustic/Inertial Information Correlation Module 1266 for demining a context of a user based on a correlation between acoustic information and inertial information obtained from one or more sensors that are associated with a user (e.g., as described in greater detail above with reference to method 800).

It is noted that in some of the embodiments described above, Host 101 does not store data representing Sensor Measurements 1214, because sensor measurements of Device 102 are processed at Device 102, which sends data representing Navigational State Estimate 1250 to Host 101. In other embodiments, Device 102 sends data representing Sensor Measurements 1214 to Host 101, in which case the modules for processing that data are present in Host 101.

Each of the above identified elements may be stored in one or more of the previously mentioned memory devices, and each of the above identified programs or modules corresponds to a set of instructions for performing a function described above. The set of instructions can be executed by one or more processors (e.g., CPUs 1202). The above identified modules or programs (i.e., sets of instructions) need not be implemented as separate software programs, procedures or modules, and thus various subsets of these modules may be combined or otherwise re-arranged in various embodiments. The actual number of processors and software modules used to implement Host 101 and how features are allocated among them will vary from one implementation to another. In some embodiments, Memory 1210 may store a subset of the modules and data structures identified above. Furthermore, Memory 1210 may store additional modules and data structures not described above.

Note that methods 600, 700, and 800 described above are optionally governed by instructions that are stored in a non-transitory computer readable storage medium and that are executed by one or more processors of Device 102 or Host 101. As noted above, in some embodiments these methods may be performed in part on Device 102 and in part on Host 101, or on a single integrated system which performs all the necessary operations. Each of the operations shown in FIGS. 6A-6D, 7A-7C, and 8A-8C optionally correspond to instructions stored in a computer memory or computer readable storage medium of Device 102 or Host 101. The 7 computer readable storage medium optionally includes a magnetic or optical disk storage device, solid state storage devices such as Flash memory, or other non-volatile memory device or devices. In some embodiments, the computer readable instructions stored on the computer readable storage medium are in source code, assembly language code, object code, or other instruction format that is interpreted or executed by one or more processors.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
   determining a first context of a first user at a first location in a physical space based on sensor measurements from one or more sensors of a set of one or more devices coupled to the first user;
   detecting movement of the first user to a second location in the physical space based on sensor measurements from one or more sensors of the set of one or more devices coupled to the first user;
   determining a second context of the first user at the second location based on sensor measurements from one or more sensors of the set of one or more devices coupled to the first user;
   generating, based on the first context, the second context, and the movement of the user from the first location to the second location, a first mapping of the physical space that includes information corresponding to a spatial relationship between the first context and the second context;
   after generating the first mapping, storing mapping information based at least in part on the first mapping for use in interpreting sensor measurements to determine movement of one or more users through the physical space; and
   providing the mapping information to one or more devices coupled to a second user different from the first user.

2. The method of claim 1, wherein the first mapping is a directed graph that includes:
   a plurality of nodes that correspond to locations in the physical space; and
   one or more links that each connect a respective pair of two nodes from the plurality of nodes and indicate that it is possible, in the physical space, to move between the two nodes in the respective pair of nodes.

3. The method of claim 2, wherein a respective link connecting two respective nodes includes information about one or more differences between the two respective nodes, wherein the one or more differences include one or more of:
   a distance between the two respective nodes in the physical place;
   a difference in altitude between the two respective nodes;
   a difference in temperature between the two respective nodes;
   a difference in humidity between the two respective nodes;
   a difference in use heading between the two respective nodes;
   a difference in atmospheric pressure between the two respective nodes;
   a difference in magnetic field between the two respective nodes;
   a difference in detected sound between the two respective nodes; and
   a difference in light detected between the two respective nodes.

4. The method of claim 2, wherein a respective link connecting two respective nodes includes information about differences in a respective variable between the two respective nodes and changes in the variable that occur as the link is traversed.

5. The method of claim 1, further comprising:
   detecting other movement of one or more users between contexts in the physical space; and
   generating, based on the other movement of the one or more users between the contexts in the physical space, one or more additional mappings of the physical space, including a second mapping of the physical space, that include information corresponding to one or more respective spatial relationships between respective contexts in the physical space.

6. The method of claim 5, wherein the second mapping is based on at least one of:
   movement of the first user between contexts in the physical space; and
   movement of a second user, different from the first user, between contexts in the physical space.

7. The method of claim 5, wherein the first mapping is different from the second mapping and the method includes generating a combined mapping of the physical space that is based on the first mapping and the second mapping.

8. The method of claim 7, wherein:
the first mapping and the second mapping each include a plurality of nodes corresponding to different contexts and a plurality of links between the nodes; and
generating the combined mapping includes combining a link from the first mapping that connects the first node and the second node with a link from the second mapping that connects the first node and the second node.

9. The method of claim 7, wherein:
the first mapping and the second mapping each include a plurality of nodes corresponding to different contexts and a plurality of links between the nodes; and
generating the combined mapping includes combining a node from the first mapping with a node from the second mapping so that links connecting to the node from the first mapping and links connecting to the node from the second mapping connect to a combined node in the combined mapping.

10. The method of claim 7, wherein generating the combined mapping of the physical space further comprises:
identifying a first node in the first mapping that corresponds to a fixed point in the physical space;
identifying a second node in the second mapping that corresponds to the fixed point in the physical space; and
aligning the first mapping with the second mapping using the first node and the second node as reference points.

11. The method of claim 1, further comprising, after generating the first mapping:
monitoring a plurality of subsequent traversals of the first mapping by one or more users;
identifying a set of three or more contexts that are repeatedly traversed in a respective order during the subsequent traversals of the first mapping; and
updating the first mapping to identify the set of contexts as a subgroup of the first mapping.

12. The method of claim 1, further comprising:
while determining a respective context of the first user, obtaining information indicating that three or more people are present in the respective context;
wherein generating the first mapping includes identifying the respective context in the first mapping as a group meeting space.

13. The method of claim 1, wherein the first context is determined based at least in part on a heading of a user while the user is at the first location.

14. The method of claim 1, further comprising, after storing the mapping information:
detecting movement of the first user based on sensor measurements from one or more sensors of the set of one or more devices coupled to the first user; and
determining a change in context of the first user based on the detected movement and the mapping information; and
adjusting operation of a respective device of the one or more devices coupled to the first user based on the change in context of the first user.

15. The method of claim 1, wherein:
the mapping information includes information indicative of differences in one or more environmental parameters between the first context and the second context; and
the method further includes, in response to detecting that the user has moved from the first context to the second context, adjusting operation of the device in accordance with the differences in the one or more environmental parameters.

16. The method of claim 1, including:
detecting movement of a respective device through the physical space;
comparing the movement of the respective device through the physical space to a plurality of mappings of the physical space that correspond to different users;
identifying a respective mapping of the physical space that is consistent with the movement of the device through the physical space; and
in response to identifying the respective mapping of the physical space as being consistent with the movement of the device through the physical space, identifying the user that corresponds to the respective mapping as the current user of the respective device.

17. A processing apparatus, the apparatus comprising:
one or more processors;
a set of one or more sensors;
memory; and
one or more programs, wherein the one or more programs are stored in the memory and configured to be executed by the one or more processors, the one or more programs comprising instructions for:
determining a first context of a first user at a first location in a physical space based on sensor measurements from one or more sensors of a set of one or more devices coupled to the first user;
detecting movement of the first user to a second location in the physical space based on sensor measurements from one or more sensors of the set of one or more devices coupled to the first user;
determining a second context of the first user at the second location based on sensor measurements from one or more sensors of the set of one or more devices coupled to the first user;
generating, based on the first context, the second context, and the movement of the user from the first location to the second location, a first mapping of the physical space that includes information corresponding to a spatial relationship between the first context and the second context;
after generating the first mapping, storing mapping information based at least in part on the first mapping for use in interpreting sensor measurements to determine movement of one or more users through the physical space; and
providing the mapping information to one or more devices coupled to a second user different from the first user.

18. A non-transitory computer readable storage medium having embodied thereon instructions, which when executed by one or more processors, perform steps of a method, the method comprising:
determining a first context of a first user at a first location in a physical space based on sensor measurements from one or more sensors of a set of one or more devices coupled to the first user;
detecting movement of the first user to a second location in the physical space based on sensor measurements from one or more sensors of the set of one or more devices coupled to the first user;
determining a second context of the first user at the second location based on sensor measurements from one or more sensors of the set of one or more devices coupled to the first user;
generating, based on the first context, the second context, and the movement of the user from the first location to the second location, a first mapping of the physical space that includes information corresponding to a spatial relationship between the first context and the second context;

after generating the first mapping, storing mapping information based at least in part on the first mapping for use in interpreting sensor measurements to determine movement of one or more users through the physical space; and providing the mapping information to one or more devices coupled to a second user different from the first user.

19. The non-transitory computer readable storage medium of claim 18, wherein the method further comprises:

receiving, from one or more sensors, sensor data for motion tracking of at least one of the one or more devices;

processing, by a hardware processor, the sensor data for the motion tracking of the least one of the one or more devices; and adjusting, by the hardware processor, the motion tracking based on interaction data, the interaction data indicative of interaction of a user with the least one of the one or more devices.

* * * * *